United States Patent
Nakajima

(10) Patent No.: US 10,785,071 B2
(45) Date of Patent: Sep. 22, 2020

(54) COMMUNICATION APPARATUS AND RECEIVED SIGNAL PROCESSING METHOD

(71) Applicant: MITSUBISHI ELECTRIC CORPORATION, Tokyo (JP)

(72) Inventor: Akinori Nakajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/488,873

(22) PCT Filed: Mar. 6, 2017

(86) PCT No.: PCT/JP2017/008851
§ 371 (c)(1),
(2) Date: Aug. 26, 2019

(87) PCT Pub. No.: WO2018/163257
PCT Pub. Date: Sep. 13, 2018

(65) Prior Publication Data
US 2019/0386856 A1   Dec. 19, 2019

(51) Int. Cl.
*H04L 25/03*   (2006.01)
*H04L 27/26*   (2006.01)

(52) U.S. Cl.
CPC .... *H04L 25/03159* (2013.01); *H04L 27/2605* (2013.01); *H04L 2025/03541* (2013.01)

(58) Field of Classification Search
CPC ........... H04L 25/03159; H04L 27/2605; H04L 2025/03541; H04L 27/2647;

(Continued)

(56) References Cited

U.S. PATENT DOCUMENTS

2007/0270273 A1* 11/2007 Fukuta ................ H04L 27/2655
475/206

FOREIGN PATENT DOCUMENTS

| JP | 2010-34672 A | 2/2010 |
| JP | 2012-70196 A | 4/2012 |
| JP | 5036655 B2 | 9/2012 |

OTHER PUBLICATIONS

3GPP TS 36.212 V9.2.0 (Jun. 2010), "3rd Generation Partnership Project; Technical Specification Group Radio Access Network; Evolved Universal Terrestrial Radio Access (E-UTRA); Multiplexing and channel coding (Release 9)," pp. 1-61.

(Continued)

*Primary Examiner* — Fitwi Y Hailegiorgis
(74) *Attorney, Agent, or Firm* — Birch, Stewart, Kolasch & Birch, LLP.

(57) ABSTRACT

A wireless communication apparatus includes components below. An equalization unit performs equalization processing on a part of a received signal corresponding to a first range and a part of the received signal corresponding to a second range. The first range includes detection target data. The second range is outside the first range. A replica generation unit decomposes the second range, on which equalization processing has been performed, into a plurality of signal components and reproduces the part of the received signal corresponding to the second range for each of the signal components to generate a replica of an interference component. An interference cancellation unit cancels the interference component from the part of the received signal corresponding to the first range by using the replica. A data extraction unit extracts the detection target data from the received signal.

12 Claims, 15 Drawing Sheets

(58) Field of Classification Search
CPC ..... H04L 27/2607; H04L 27/01; H04L 27/26; H04J 11/0063; H04B 7/0413
USPC .......................................... 375/229; 475/206
See application file for complete search history.

(56) References Cited

OTHER PUBLICATIONS

Kuma et al., "Performance of zero CP single carrier modulation scheme using overlap FDE," Proceedings of the 2008 IEICE General Conference, Mar. 5, 2008, p. 494.

Li et al., "An iterative signal detection scheme for MIMO SC-FDE without Cyclic Prefix using ISI canceller and MLD," IEICE Technical Report, vol. 110, No. 433, Feb. 23, 2011, pp. 31-36.

Nakajima et al., "Layered Soft Interference Cancellation for SC-MIMO Spatial Multiplexing Transmission with High Level Data Modulation," IEICE Trans. Commun., vol. E93-B, No. 6, Jun. 2010, pp. 1641-1644.

Takeda et al., "DS-CDMA HARQ with Overlap FDE," IEICE Trans. Commun., vol. E90-B, No. 11, Nov. 2007, pp. 3189-3196.

Takeda et al., "Iterative Overlap FDE for Multicode DS-CDMA," IEICE Trans. on Commun., vol. E91-B, No. 6, Jun. 2008, pp. 1942-1951.

\* cited by examiner

COMMUNICATION APPARATUS AND RECEIVED SIGNAL PROCESSING METHOD

FIELD

The present invention relates to a communication apparatus and a received signal processing method, for performing single carrier or multicarrier transmission in which a cyclic prefix (CP) is not used or a delay amount in a delay wave exceeds a CP length.

BACKGROUND

In digital wireless communication, a process of equalizing a received signal is performed on a receiving side so as to prevent inter symbol interference (ISI) caused by the spread of delay waves. When equalization processing is performed in a frequency domain, there is used a technique for adding, as a guard interval called CP, a copy of data at the end of each of divided data pieces of a predetermined length, to the top of each of the divided data pieces. Addition of the CP enables prevention of interference from adjacent blocks when a received signal is converted into a signal in the frequency domain. However, a CP length needs to be larger than a multipath delay amount. Thus, the CP length needs to be increased so as to avoid the influence of a large multipath delay. Accordingly, there is a problem of a decrease in transmission efficiency due to an increase in the CP length.

There is known a method of block transmission using no CP called overlap frequency domain equalization (FDE). According to this method, in order to improve transmission efficiency, a section including a detection target block is converted into the frequency domain, and equalized in the frequency domain. Then, the detection target block is extracted after the section is converted into a time domain. In the overlap frequency domain equalization, interference components of inter block interference (IBI) and inter symbol interference remain in a received signal after equalization in the frequency domain. Therefore, reception performance tends to be lower than that in block transmission using a CP.

Patent Literature 1 discloses a method for reducing interference components included in a received signal in block transmission using no CP. In this method, replicas of the interference components are generated by use of the received signal on which equalization processing has been performed. Then, the remaining interference components are canceled by use of the generated replicas. Cancellation of the interference components is repeated by use of the overlap frequency domain equalization and the replicas. As a result, the interference components included in the received signal are reduced and a decrease in reception performance is prevented.

CITATION LIST

Patent Literature

Patent Literature 1: Japanese Patent Application Laid-open No. 2012-70196

SUMMARY

Technical Problem

However, in the technique described in Patent Literature 1 above, the replica is generated in frame units. Thus, accuracy in generating the replica is low. Therefore, the technique described in Patent Literature 1 has a problem in that the interference components still remaining in the received signal cannot be reduced in some cases.

The present invention has been made in view of the above. An object of the present invention is to provide a communication apparatus capable of increasing accuracy in generating a replica of an interference component to prevent a decrease in reception performance in single carrier or multicarrier transmission in which a CP is not used or a delay amount in a delay wave exceeds a CP length.

Solution to Problem

A communication apparatus according to an aspect of the present invention includes: an equalization unit that performs equalization processing on a part of a received signal corresponding to a first range and a part of the received signal corresponding to a second range, the first range including detection target data, the second range being outside the first range; a replica generation unit that generates a replica of an interference component for the part of the received signal corresponding to the first range by using the part of the received signal corresponding to the second range on which the equalization processing has been performed; an interference cancellation unit that cancels the interference component from the part of the received signal corresponding to the first range by using the generated replica; and a data extraction unit that extracts the detection target data from the received signal. The replica generation unit is characterized by decomposing the part of the received signal corresponding to the second range into a plurality of signal components, and reproducing the part of the received signal corresponding to the second range for each of the signal components to generate the replica.

Advantageous Effects of Invention

The communication apparatus according to the present invention can achieve an effect of generating a replica of inter block interference with higher accuracy to prevent a decrease in reception performance in single carrier or multicarrier transmission in which a CP is not used or a delay amount in a delay wave exceeds a CP length.

DESCRIPTION OF EMBODIMENTS

Hereinafter, communication apparatuses and received signal processing methods according to embodiments of the present invention will be described in detail based on the drawings. It should be noted that the present invention is not limited to the embodiments.

First Embodiment

Figure 1:
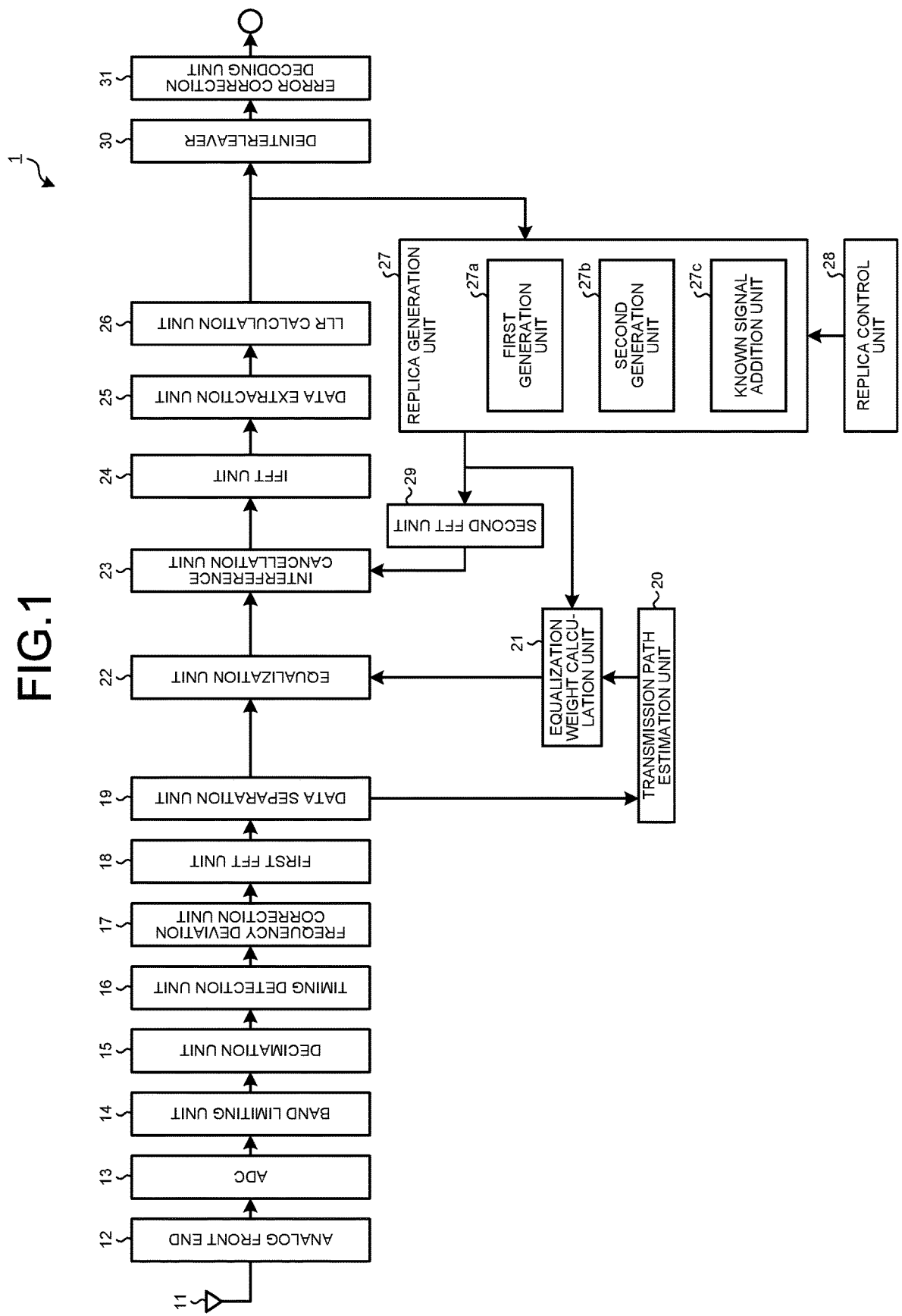
FIG. 1 is a diagram illustrating an example of a reception configuration of a wireless communication apparatus according to a first embodiment of the present invention.

FIG. 1 is a diagram illustrating an example of a reception configuration of a wireless communication apparatus according to a first embodiment of the present invention. A wireless communication apparatus 1 illustrated in FIG. 1 includes an antenna 11, an analog front end 12, an analog-to-digital converter (ADC) 13, a band limiting unit 14, a decimation unit 15, a timing detection unit 16, a frequency deviation correction unit 17, and a first fast Fourier transform (FFT) unit 18. The wireless communication apparatus 1 further includes a data separation unit 19, a transmission path estimation unit 20, an equalization weight calculation unit 21, an equalization unit 22, an interference cancellation unit 23, an inverse FFT (IFFT) unit 24, a data extraction unit 25, and a log likelihood ratio (LLR) calculation unit 26. The wireless communication apparatus 1 further includes a replica generation unit 27, a replica control unit 28, a second FFT unit 29, a deinterleaver 30, and an error correction decoding unit 31. The replica generation unit 27 includes a first generation unit 27a, a second generation unit 27b, and a known signal addition unit 27c.

The antenna 11 receives a wireless signal from a transmitting-side wireless communication apparatus. The wireless signal received by the antenna 11 includes a known signal such as a known preamble added on the transmitting side. The antenna 11 inputs the received signal to the analog front end 12. The analog front end 12 down-converts the signal input from the antenna 11, and inputs the down-converted signal to the ADC 13. The ADC 13 converts the input analog signal into a digital signal, and inputs the digital signal to the band limiting unit 14. The band limiting unit 14 limits the band of the input digital signal, and inputs the digital signal with the limited band to the decimation unit 15. The decimation unit 15 reduces the sampling rate of the input signal, and inputs the signal subjected to reduction of the sampling rate to the timing detection unit 16. The timing detection unit 16 detects the symbol block timing of the input signal. Specifically, the timing detection unit 16 detects the symbol block timing by performing cross-correlation processing using a known preamble and the like, and inputs the signal to the frequency deviation correction unit 17.

The frequency deviation correction unit 17 estimates the frequency deviation of the input signal by using the known preamble and the like, and performs frequency deviation correction on the data area of the input signal by using the estimated frequency deviation. Then, the first FFT unit 18 performs FFT processing on the input signal to convert the input signal into a signal in the frequency domain, and inputs the received signal in the frequency domain to the data separation unit 19. The data separation unit 19 separates the input received signal into a known signal including the above-described known preamble and the like, and data. The data separation unit 19 inputs the known signal to the transmission path estimation unit 20, and inputs a signal in the frequency domain including the data to the equalization unit 22. The transmission path estimation unit 20 estimates a transmission path by using the input known signal. The equalization weight calculation unit 21 calculates an equalization weight for overlap frequency domain equalization for each frequency based on a transmission path estimation result and a replica to be described below, and inputs the calculated equalization weights to the equalization unit 22. The equalization weight is a weight determined based on the least-squares-error criterion on the basis of the received signal on which interference cancellation has been performed. The equalization weight is calculated in consideration of the electric power of an interference component to be canceled after equalization processing. The equalization unit 22 performs equalization processing on a part of the received signal corresponding to a first range and a part of the received signal corresponding to a second range for each frequency by using the input equalization weights. The first range includes detection target data. The second range is outside the first range.

The interference cancellation unit 23 cancels an interference component for the part of the received signal corresponding to the first range from the received signal. The interference cancellation unit 23 cancels the interference component by using a replica generated by the replica generation unit 27 to be described below. The IFFT unit 24 performs IFFT processing on the received signal from which the interference component has been canceled, to convert the received signal into a signal in a time domain, and inputs the converted signal to the data extraction unit 25. The data extraction unit 25 extracts the detection target data from the input received signal, and inputs the detection target data to the LLR calculation unit 26. The data extraction unit 25 extracts the detection target data from the central part of the received signal in the time domain by using the fact that interference components are unevenly distributed at both ends of the received signal in the time domain. The LLR calculation unit 26 calculates LLRs of all the bits of each symbol, and inputs the calculated LLRs to the replica generation unit 27.

Figure 2:
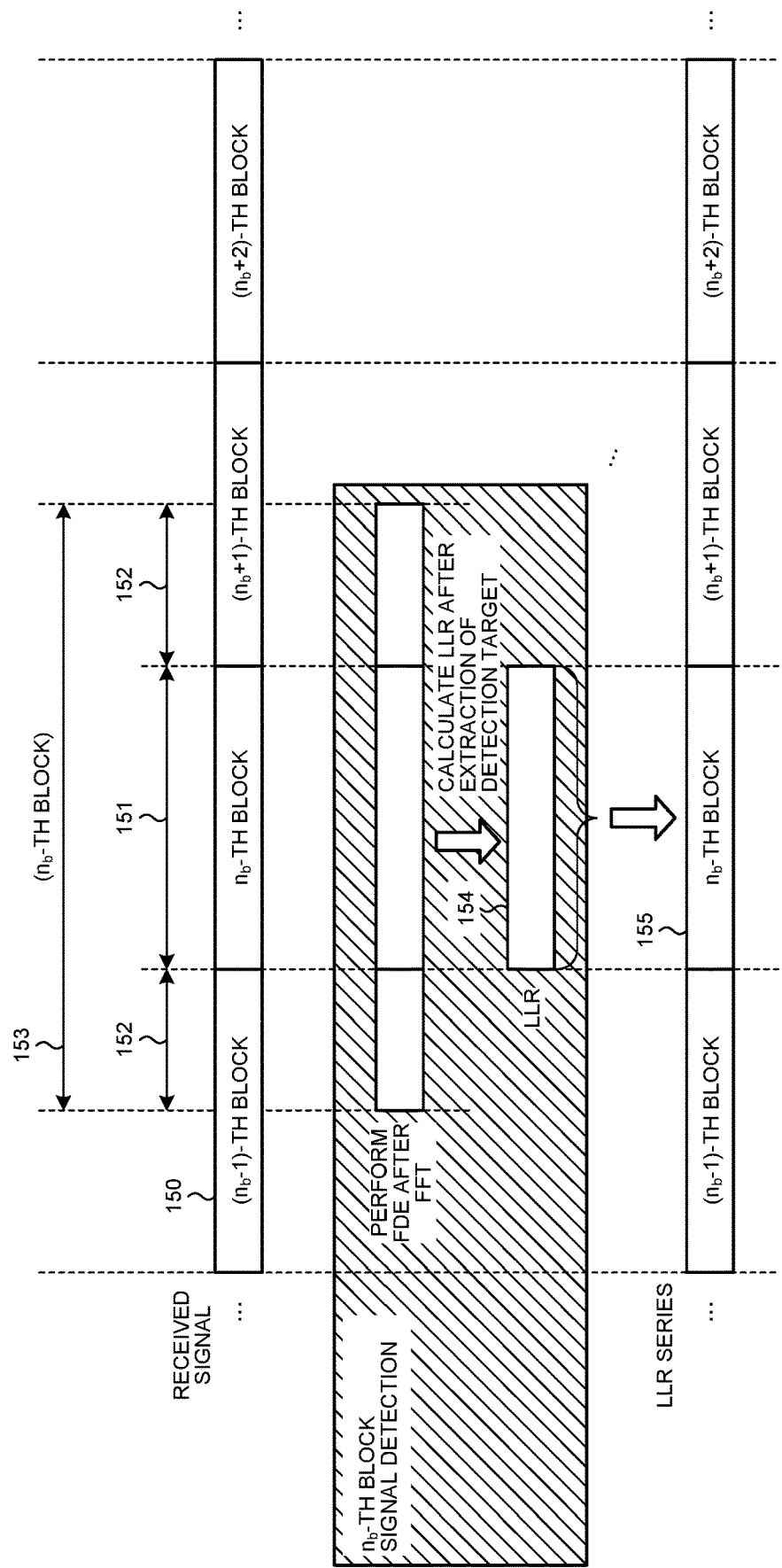
FIG. 2 is a diagram illustrating the concept of overlap frequency domain equalization to be performed by the wireless communication apparatus illustrated in FIG. 1.

FIG. 2 is a diagram illustrating the concept of overlap frequency domain equalization to be performed by the wireless communication apparatus 1 illustrated in FIG. 1. Assuming that detection target data corresponds to an $n_b$-th block among a plurality of blocks included in a received signal 150, the first FFT unit 18 converts a part of the received signal corresponding to a processing range 153 into a signal in the frequency domain. The processing range 153 includes a first range 151 and a second range 152. The first range 151 is a detection target range including the detection target data. The second range 152 is a range outside the first range. Therefore, the equalization unit 22 performs equalization processing on the part of the received signal corresponding to the processing range 153. The interference cancellation unit 23 cancels an interference component from the received signal on which equalization processing has been performed. The data extraction unit 25 extracts the detection target data from the received signal. Then, the LLR calculation unit 26 calculates an LLR 154. Here, the $n_b$-th block is assumed to be the detection target data. Meanwhile, it is possible to obtain an LLR series 155 by similarly performing extraction of detection target data and calculating LLRs also for the other blocks.

The description returns to FIG. 1. The replica generation unit 27 decomposes a part of the received signal corresponding to the second range 152 into a plurality of signal components, and reproduces the part of the received signal corresponding to the second range 152 for each signal component to generate a replica. The replica generation unit 27 generates a replica by using the signal component specified by the replica control unit 28. The replica generated by the replica generation unit 27 is used for cancelling an interference component from the received signal in the interference cancellation unit 23.

Figure 3:
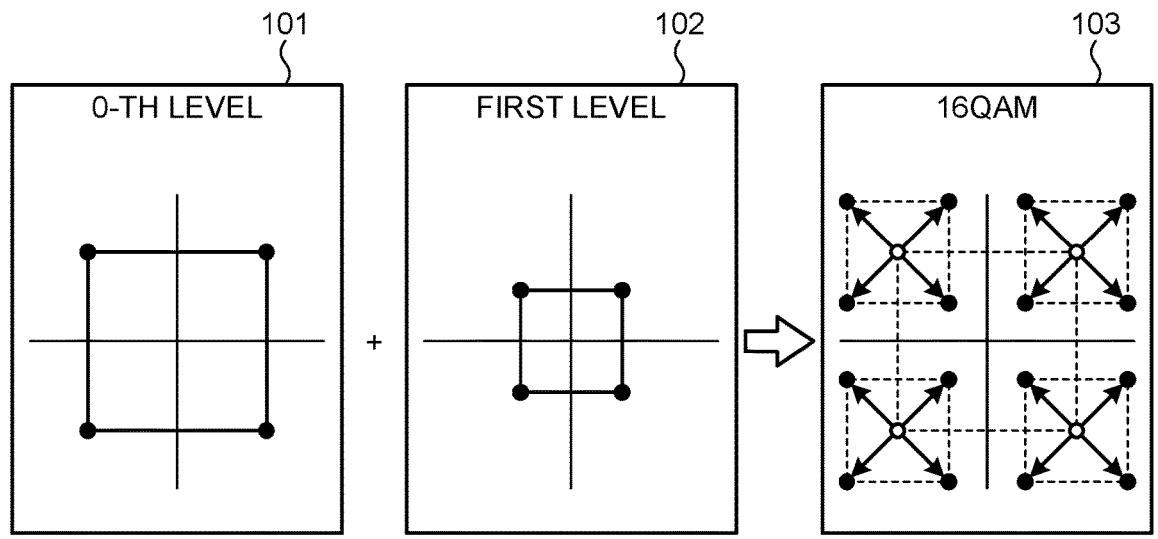
FIG. 3 is a diagram illustrating an example of signal components to be used by a replica generation unit illustrated in FIG. 1, for generating a replica.

FIG. 3 is a diagram illustrating an example of signal components to be used by the replica generation unit 27 illustrated in FIG. 1, for generating a replica. In the present embodiment, a received signal subjected to multi-level modulation is regarded as a plurality of hierarchized sub-symbols. In this case, the sub-symbol is an example of a signal component. For example, a 16 quadrature amplitude modulation (QAM) symbol 103 can be regarded as a quadrature phase shift keying (QPSK) symbol hierarchized into two levels different in signal power. The two levels of the QPSK symbol are referred to as a 0-th level QPSK sub-symbol 101 and a first level QPSK sub-symbol 102 in descending order of amplitude. The hierarchized sub-symbols are characterized in that the distance between signal points is shorter in an upper level, so that accuracy in determining a signal of a QPSK sub-symbol is low and accuracy in generating a replica is also low. The replica generation unit 27 can generate a replica for each sub-symbol level.

Described below is an example of a method for generating a replica of a sub-symbol, to be performed by the replica generation unit 27. Assuming that $\lambda_{m'}(0)$ is an LLR of a 0-th bit of an m'-th level, a replica of the m'-th level sub-symbol is expressed by mathematical formula (1) below. Here, an amplitude $a_m$ in each level is expressed by mathematical formula (2) below.

$$\hat{d}_{m'}(t) = \frac{a_{m'}}{\sqrt{2}} \left[ \begin{array}{c} \tanh\left\{\frac{\lambda_{n_t,m'-1}(0)}{2}\right\}\tanh\left\{\frac{\lambda_{n_t,m'}(0)}{2}\right\} + \\ j\tanh\left\{\frac{\lambda_{n_t,m'-1}(1)}{2}\right\}\tanh\left\{\frac{\lambda_{n_t,m'}(1)}{2}\right\} \end{array} \right] \quad \text{[Formula 1]}$$

$$a_m = \frac{2^{M-m-1}}{\sqrt{\sum_{m'=0}^{M-1} 2^{2m'}}} \quad \text{[Formula 2]}$$

The generated replica of the sub-symbol is used in the equalization weight calculation unit 21 and the interference cancellation unit 23. An example of interference cancellation will be cited below. In the following description, characters may be shown in the following manner in some cases: when a character with a bar is shown, "(bar)" is put after the character; when a character with a hat is shown, "(hat)" is put after the character; and when a character with a tilde is shown, "(tilde)" is put after the character.

With regard to processing for an f-th frequency, let R(tilde) (f) be a received signal subjected to frequency domain equalization, H(bar) (f) be the equivalent channel gain of an interference component after frequency domain equalization, and D(hat) (f) be the replica of the m'-th level sub-symbol in the frequency domain. Then, the received signal R(hat) (f) subjected to cancellation of interference is expressed by mathematical formula (3) below. It should be noted that each of $m_f$ and $m_b$ denotes the range of target levels for replicas of reproduced sub-symbols.

$$\hat{R}(f) = \tilde{R}(f) - \overline{H}(f) \sum_{m'=0}^{m_{forb}-1} \hat{D}_{m'}(f) \quad \text{[Formula 3]}$$

Figure 4:
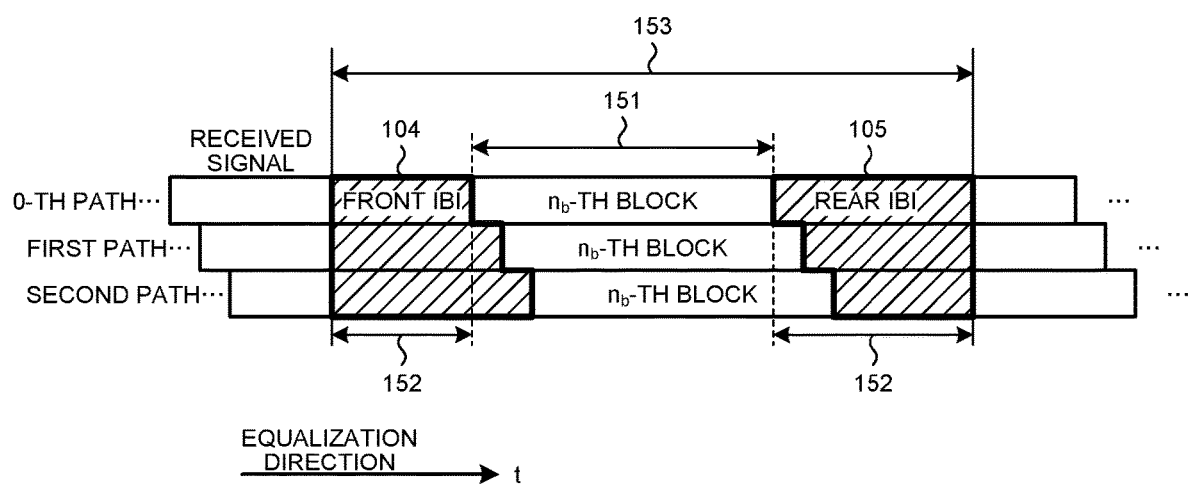
FIG. 4 is a diagram illustrating definitions of interference components to be canceled from a received signal, by the wireless communication apparatus illustrated in FIG. 1.

FIG. 4 is a diagram illustrating definitions of interference components to be canceled from a received signal, by the wireless communication apparatus 1 illustrated in FIG. 1. The part of the received signal corresponding to the second range 152 includes a front IBI 104 and a rear IBI 105. The front IBI 104 is a front signal corresponding to a past signal received prior to the first range 151 with respect to a direction on a time axis along which equalization processing proceeds. The rear IBI 105 is a rear signal corresponding to a future signal to be received later than the front signal with respect to the direction on the time axis. Interference components for a part of the received signal corresponding to the first range 151 include an interference component generated by an influence of the front IBI 104 and an interference component generated by an influence from the rear IBI 105.

The description returns to FIG. 1. The first generation unit 27a decomposes the front signal into a plurality of signal components, and reproduces the front signal for each signal component to generate a replica of the interference component. Specifically, the first generation unit 27a decomposes the front signal into symbols of a plurality of levels to generate a replica of the interference component for each level. The second generation unit 27b decomposes the rear signal or ISI into a plurality of signal components, and reproduces the rear signal or ISI for each signal component to generate a replica of the interference component. Specifically, the second generation unit 27b decomposes a second interference component into symbols of a plurality of levels to generate a replica for each level. As a response to a known signal multiplexed to the received signal according to a frame format, the known signal addition unit 27c obtains a corresponding known signal from among a plurality of known signals internally held in advance, and adds the obtained known signal to the replica. With the above-described function, the replica generation unit 27 inputs the generated replicas to the second FFT unit 29 and the equalization weight calculation unit 21.

The second FFT unit 29 converts the input replicas into signal components in the frequency domain, and inputs the converted replicas to the interference cancellation unit 23. The equalization unit 22, the interference cancellation unit 23, and the data extraction unit 25 repeatedly perform equalization processing, cancellation of interference components, and extraction of detection target data. The number of the signal components to be used by the replica generation unit 27 for reproducing the front signal is equal to or larger than the number of the signal components to be used by the replica generation unit 27 for reproducing the rear signal. The number of the signal components to be used by the replica generation unit 27 for reproducing the front signal is increased as the equalization processing, the cancellation of interference components, and the process of extracting detection target data are repeated. The data extraction unit 25 regards the extracted detection target data as a final detection result when, as a result of expansion of a replica generation range, the number of the signal components included in the replica generation range has reached a predetermined number such as the maximum number of the signal components obtained by decomposition of a first interference component. Then, the detection result is input from the LLR calculation unit 26 to the deinterleaver 30.

The deinterleaver 30 interleaves, in blocks, the LLR series that is latest at the time point of input of the detection result and restores a permutation, and inputs a signal to the error correction decoding unit 31. The error correction decoding unit 31 performs error correction decoding of the input signal to obtain a bit sequence.

Next, the hardware configuration of the wireless communication apparatus 1 will be described. Each constituent element of the wireless communication apparatus 1 can be implemented by hardware. The antenna 11 is an antenna for wireless communication. The other constituent elements are implemented by, for example, processing circuits. A plurality of constituent elements may be implemented by a single processing circuit. Alternatively, a single constituent element may be implemented by a plurality of processing circuits.

In addition, the processing circuit may be dedicated hardware. Alternatively, the processing circuit may be a control circuit including a memory and a central processing unit (CPU) (also referred to as a central processor, processing unit, arithmetic unit, microprocessor, microcomputer, processor, or digital signal processor (DSP)) that executes a program stored in the memory. Here, examples of the memory include a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disk, a mini disk, and a digital versatile disk (DVD).

Figure 5:
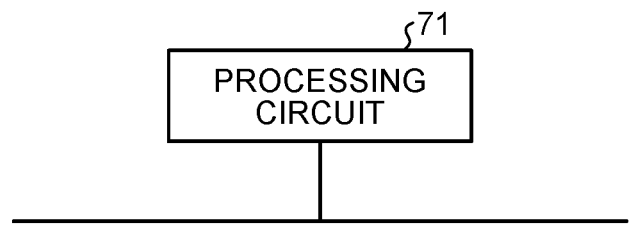
FIG. 5 is a diagram illustrating an example of implementing the function of the wireless communication apparatus illustrated in FIG. 1 by use of a processing circuit that is dedicated hardware.

In the case where the processing circuit is implemented by dedicated hardware, the processing circuit is exemplified by a processing circuit 71 illustrated in FIG. 5. FIG. 5 is a diagram illustrating an example of implementing the function of the wireless communication apparatus 1 illustrated in FIG. 1 by use of a processing circuit that is dedicated hardware. Examples of the processing circuit 71 include a single circuit, a composite circuit, a programmed processor, a parallel-programmed processor, an application specific integrated circuit (ASIC), a field programmable gate array (FPGA), and a combination thereof.

Figure 6:
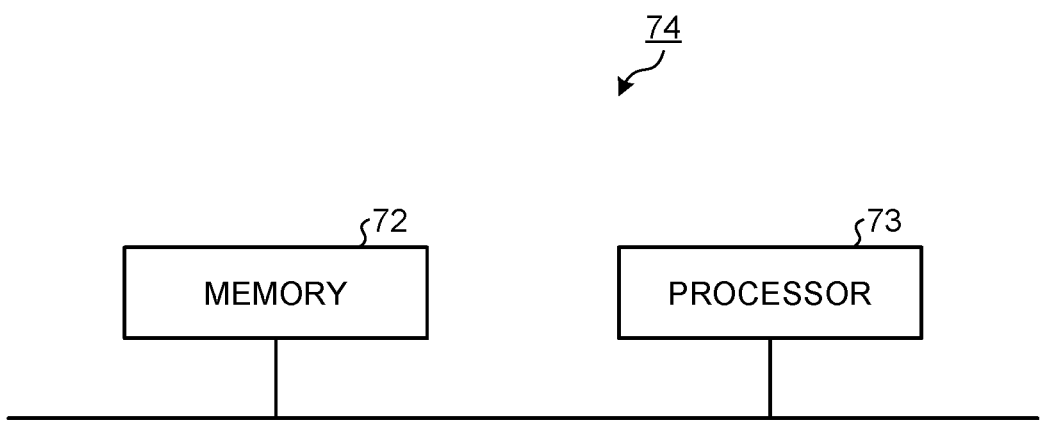
FIG. 6 is a diagram illustrating an example of implementing the function of the wireless communication apparatus illustrated in FIG. 1 by use of a processing circuit that is a control circuit.

In the case where the processing circuit is implemented by a control circuit including a CPU, the control circuit is exemplified by a control circuit with a configuration illustrated in FIG. 6. FIG. 6 is a diagram illustrating an example of implementing the function of the wireless communication apparatus 1 illustrated in FIG. 1 by use of a processing circuit that is a control circuit. As illustrated in FIG. 6, a control circuit 74 includes a memory 72 and a processor 73. The memory 72 is a CPU. In the case where the processing circuit is implemented by the control circuit 74, the processing circuit is implemented by the processor 73 reading and executing a program corresponding to each process of each constituent element, stored in the memory 72. In addition, the memory 72 is also used as a temporary memory in each process performed by the processor 73.

A part of each constituent element included in the wireless communication apparatus 1 may be implemented by dedicated hardware, and another part may be implemented by a control circuit including a CPU.

Figure 7:
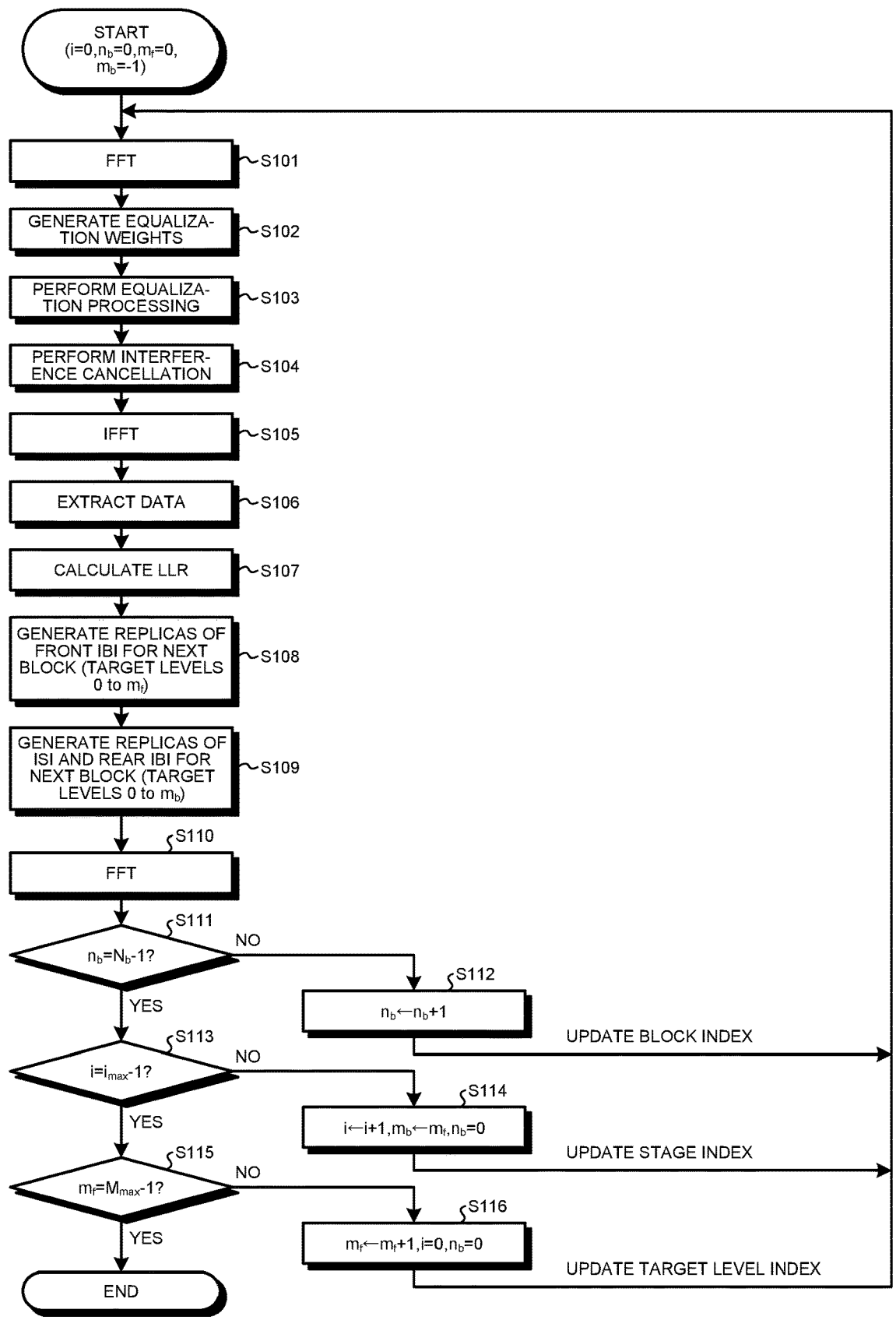
FIG. 7 is a flowchart for describing a receiving operation of the wireless communication apparatus illustrated in FIG. 1.

Next, a receiving operation of the wireless communication apparatus 1 will be described. FIG. 7 is a flowchart for describing the receiving operation of the wireless communication apparatus 1 illustrated in FIG. 1. Here, in repetition of equalization processing and interference cancellation, each repetition unit is referred to as a stage. At the start of the receiving operation, values of indices are assumed as follows: a repetition stage index i=0, a first target level index $m_f=0$, a second target level index $m_b=-1$, and a detection target block index $n_b=0$, where the first target level index is the maximum value of the number of levels to be reproduced in the front IBI, and the second target level index is the maximum value of the number of levels to be reproduced in the rear IBI.

The first FFT unit 18 performs FFT processing on the part of the received signal corresponding to the processing range 153 to generate a signal in the frequency domain (step S101). Subsequently, the equalization weight calculation unit 21 generates equalization weights based on a transmission path estimation value estimated by use of a known signal obtained from the received signal (step S102). The equalization unit 22 performs equalization processing on the received signal in the frequency domain by using the generated equalization weights (step S103). Subsequently, the interference cancellation unit 23 performs a process of canceling the interference components included in the received signal by using the replicas (step S104). However, because there is no generated replica at a first repetition, interference cancellation is omitted.

The IFFT unit 24 performs IFFT processing for converting the received signal in the frequency domain into a signal in the time domain (step S105). The data extraction unit 25 extracts detection target data of a current block (step S106). The LLR calculation unit 26 calculates an LLR by using the extracted detection target data (step S107).

The first generation unit 27a of the replica generation unit 27 generates a replica of the front IBI for each of 0-th to $m_f$-th levels for the next block, by using the calculated LLR (step S108). In the first repetition, because $m_f=0$, a replica of the front IBI for the 0-th level is generated. The second generation unit 27b of the replica generation unit 27 generates a replica of the rear IBI for each of 0-th to $m_b$-th levels for the next block, by using the calculated LLR (step S109). In the first repetition, there is no corresponding LLR obtained. Therefore, no replica of the rear IBI is generated. The second FFT unit 29 converts the obtained replicas into signals in the frequency domain, and inputs the signals to the interference cancellation unit 23 (step S110).

The equalization unit 22 determines whether the detection target block index $n_b$ has reached the number $N_b-1$ of blocks in one frame (step S111). If the detection target block index $n_b$ has not reached the number $N_b-1$ of blocks in one frame (step S111: No), the block index $n_b$ is incremented and updated (step S112), and the process returns to step S101 to perform processing on the next block. If the detection target block index $n_b$ has reached the number $N_b$ of blocks in one frame (step S111: Yes), that is, if processing for one frame has been completed, the equalization unit 22 determines whether the repetition stage index i has reached the maximum number $i_{max}-1$ of repetition stages (step S113). If the repetition stage index i has not reached the maximum number $i_{max}-1$ of repetition stages (step S113: No), the repetition stage index i is incremented and updated, and $n_b$ is set such that $n_b=0$ so as to return to the process of a 0-th detection target block. Furthermore, the second target level index $m_b$ is made equal to the first target level index $m_f$ so as to equally expand the target range of reproduction of the rear IBI and the target range of reproduction of the front IBI (step S114). As a result, a replica of the rear IBI is generated in the subsequent process. If the repetition stage index i has reached the maximum number $i_{max}-1$ of repetition stages (step S113: Yes), the equalization unit 22 determines whether the first target level index $m_f$ has reached $M_{max}-1$ (step S115). If the first target level index $m_f$ has not reached $M_{max}-1$ (step S115: No), the equalization unit 22 increments and updates the first target level index $m_f$ (step S116), and returns to the process of step S101. If the first target level index $m_f$ has reached $M_{max}-1$ (step S115: Yes), the repetitive processing ends.

Figure 8:
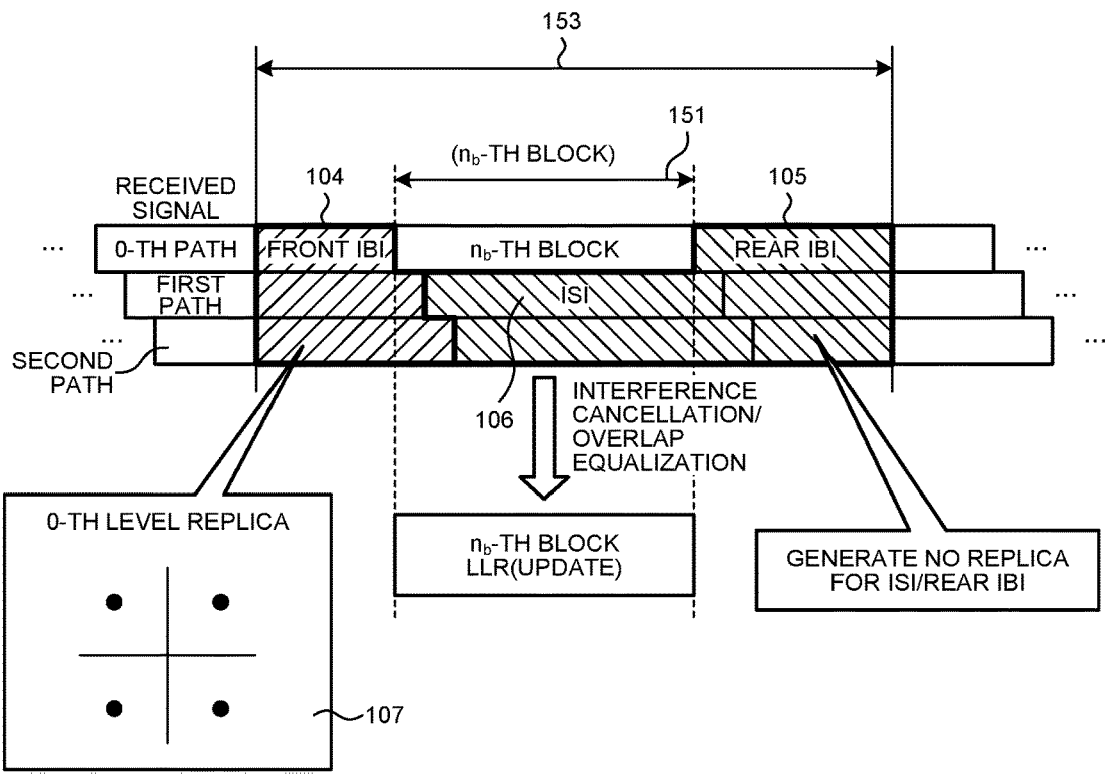
FIG. 8 is a diagram illustrating a first example of a replica to be used in an interference cancellation process to be performed by the wireless communication apparatus illustrated in FIG. 1.

FIG. 8 is a diagram illustrating a first example of a replica to be used in an interference cancellation process to be performed by the wireless communication apparatus 1 illustrated in FIG. 1. FIG. 8 illustrates an example of using 16QAM as a modulation scheme, where $M_{max}=2$. When performing cancellation of interference on the $n_b$-th detection block for the first time (in the case of $m_f=0$ and $m_b=-1$), the interference cancellation unit 23 performs cancellation of interference on the front IBI 104 corresponding to the first interference component by using a 0-th level replica 107. Meanwhile, the interference cancellation unit 23 does not perform cancellation of interference on the rear IBI 105 and an ISI 106 corresponding to the second interference component because no replica has been generated for the rear IBI 105 and the ISI 106.

Figure 9:
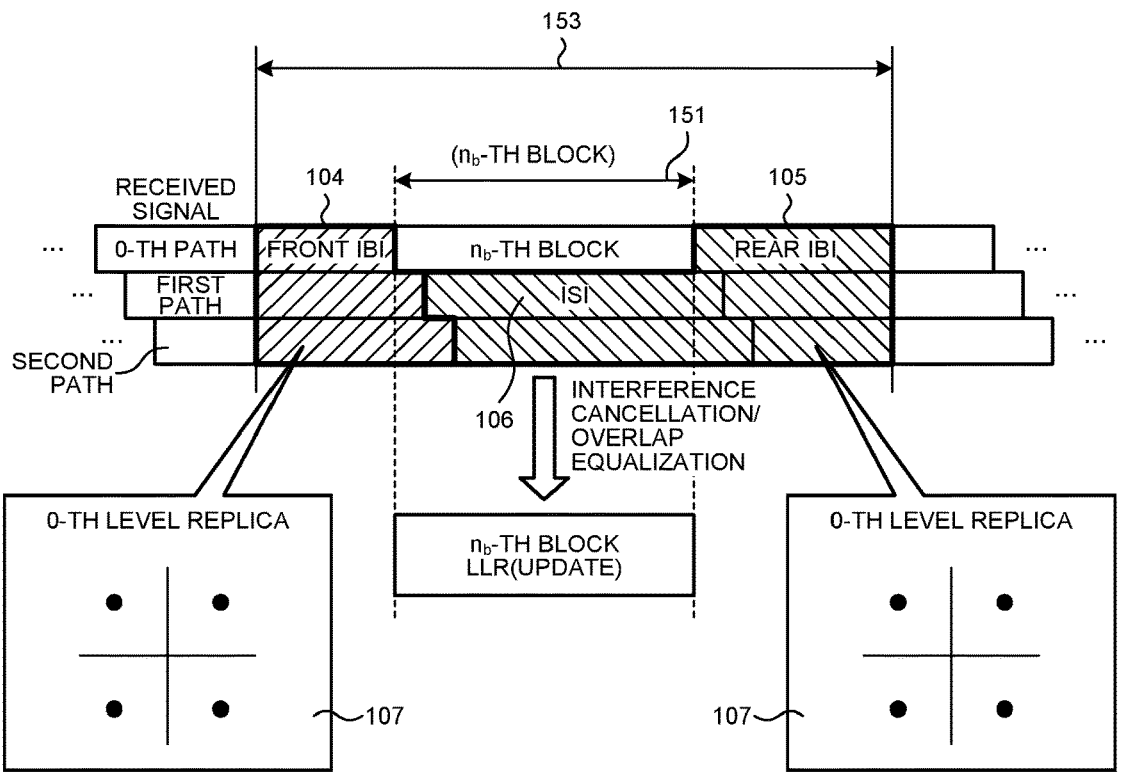
FIG. 9 is a diagram illustrating a second example of the replica to be used in the interference cancellation process to be performed by the wireless communication apparatus illustrated in FIG. 1.

FIG. 9 is a diagram illustrating a second example of the replica to be used in the interference cancellation process to be performed by the wireless communication apparatus 1 illustrated in FIG. 1. When performing cancellation of interference on the $n_b$-th detection block for the second time (in the case of $m_f=0$ and $m_b=0$), the interference cancellation unit 23 performs cancellation of interference on the front IBI 104, the rear IBI 105, and the ISI 106 by using the 0-th level replica 107.

Figure 10:
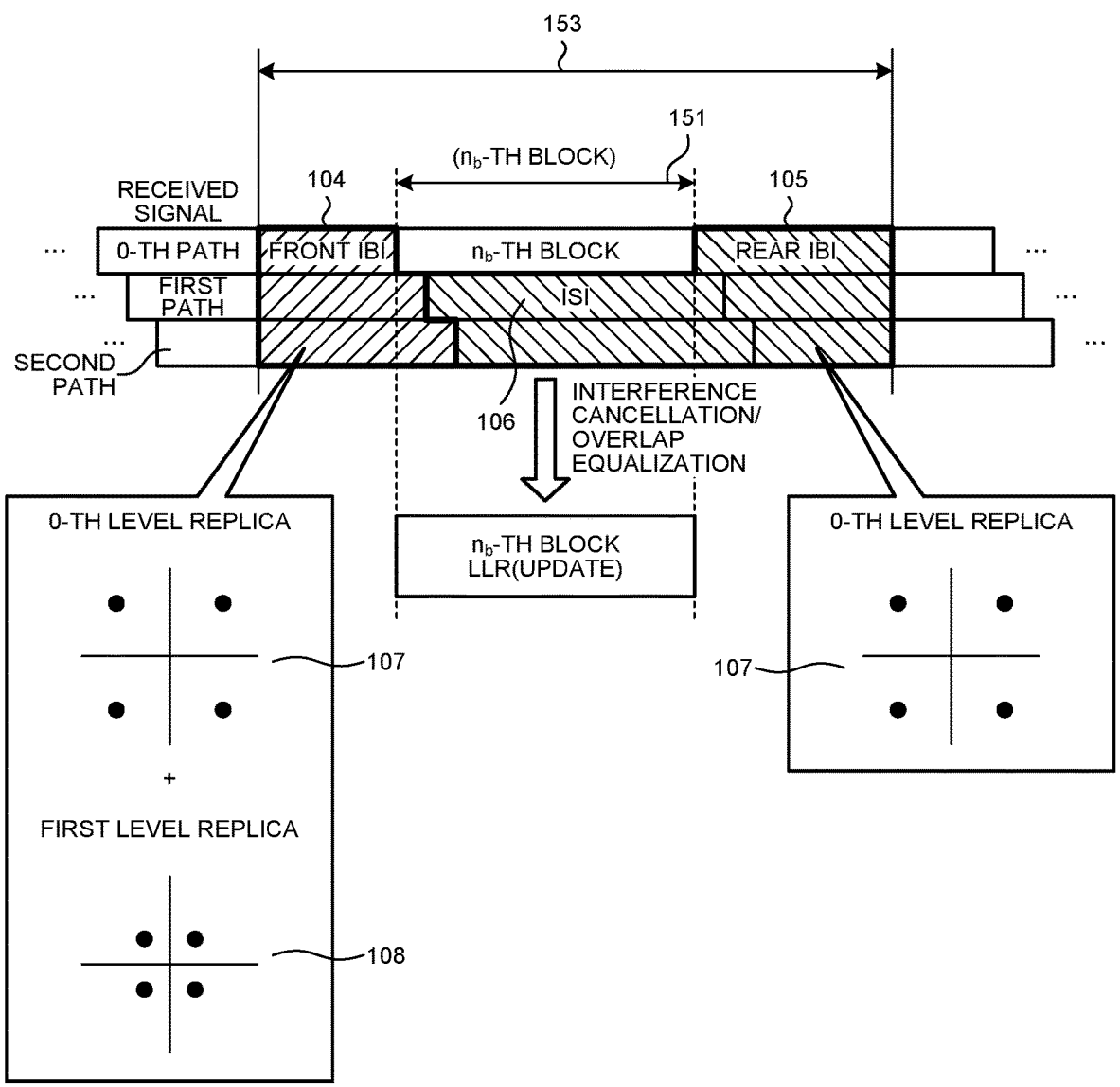
FIG. 10 is a diagram illustrating a third example of the replica to be used in the interference cancellation process to be performed by the wireless communication apparatus illustrated in FIG. 1.

FIG. 10 is a diagram illustrating a third example of the replica to be used in the interference cancellation process to be performed by the wireless communication apparatus 1 illustrated in FIG. 1. When performing cancellation of interference on the $n_b$-th detection block for the third time (in the case of $m_f=1$ and $m_b=0$), the interference cancellation unit 23 performs cancellation of interference on the front IBI 104 by using the 0-th level replica 107 and a first level replica 108, and performs cancellation of interference on the rear IBI 105 and the ISI 106 by using the 0-th level replica 107.

Figure 11:
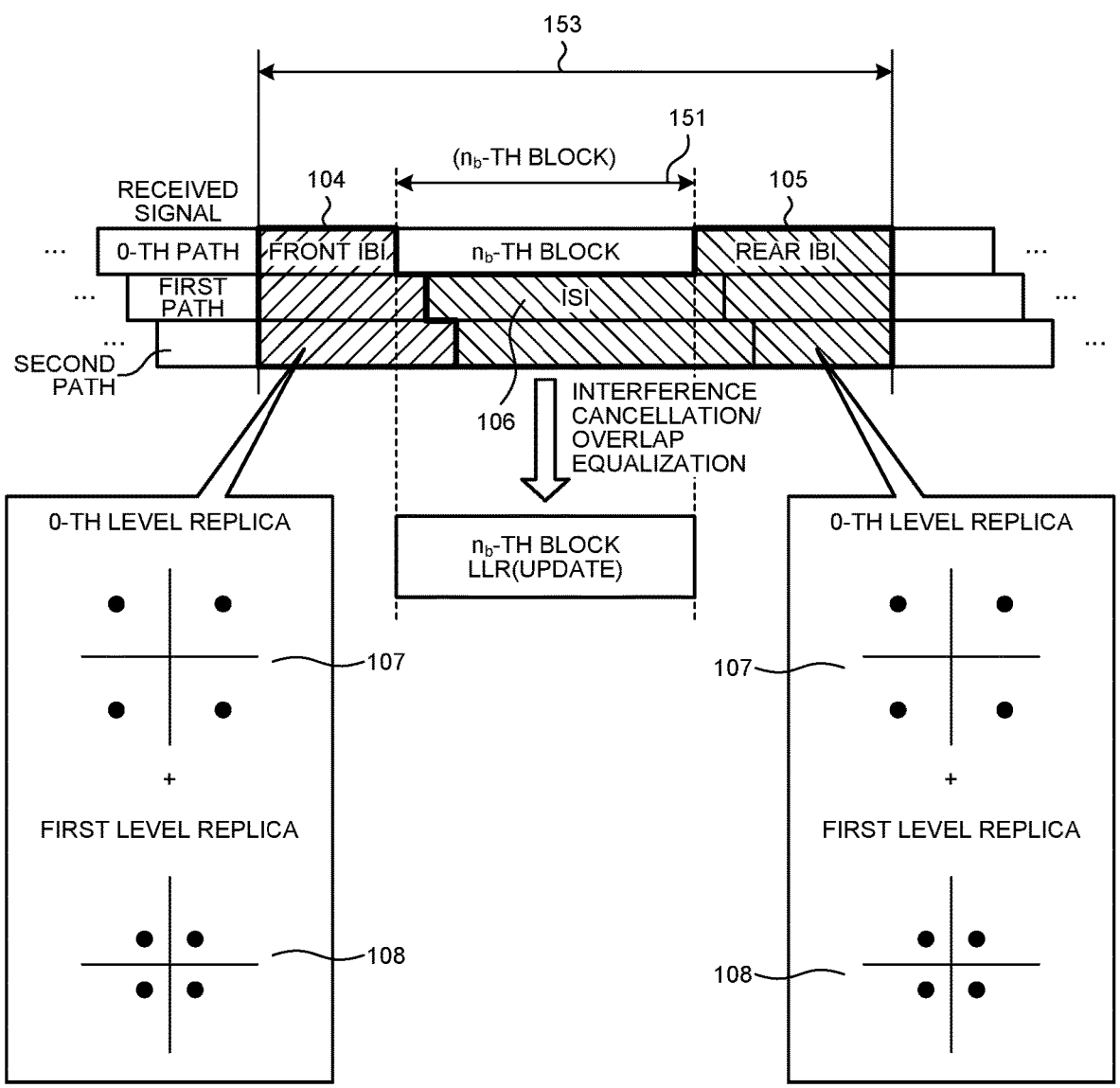
FIG. 11 is a diagram illustrating a fourth example of the replica to be used in the interference cancellation process to be performed by the wireless communication apparatus illustrated in FIG. 1.

FIG. 11 is a diagram illustrating a fourth example of the replica to be used in the interference cancellation process to be performed by the wireless communication apparatus 1 illustrated in FIG. 1. When performing cancellation of interference on the $n_b$-th detection block for the fourth time (in the case of $m_f=1$ and $m_b=1$), the interference cancellation unit 23 performs cancellation of interference on the front IBI 104, the rear IBI 105, and the ISI 106 by using the 0-th level replica 107 and the first level replica 108.

The first target level index $m_f$ indicates a first range that is the range of signal components to be used by the replica generation unit 27 for reproducing the front IBI that is the first interference component. The second target level index $m_b$ indicates a second range that is the range of signal components to be used by the replica generation unit 27 for reproducing the rear IBI that is the second interference component. The above-described operation enables the first target level index $m_f$ to be maintained at a value equal to or larger than the second target level index $m_b$, so that it is possible to set the first range such that the first range is equal to or larger than the second range.

Furthermore, accuracy in generating a replica differs between sub-symbols of a plurality of levels included in one symbol. However, in the case of generating a replica in units of one symbol, replicas for all the levels are simultaneously generated. Thus, accuracy in generating a replica decreases. Meanwhile, in the case where a replica is generated for each of the sub-symbols of the plurality of levels as signal components obtained by decomposition of an interference component as described above, generation of a replica starts from a sub-symbol of a level that is high in accuracy in replica generation, and the range of levels for which replicas are generated is expanded along with the repetitive processing. It is thus possible to increase accuracy in replica generation. As a result, the process of canceling interference is performed by use of replicas with high accuracy, so that an effect of reducing interference components is enhanced. It is thus possible to enhance reception performance.

Furthermore, according to the above operation, a replica of the front IBI 104 is generated by sequential use of an equalization result for an immediately preceding block at a current repetition stage. The equalization result of the immediately preceding block at the current repetition stage is higher in reliability than an equalization result for the same block in the previous repetition stage. Therefore, it is possible to generate a replica with higher accuracy. In addition, a replica of the rear IBI 105 is generated by use of an equalization result of the previous repetition stage. At this time, in the case where the range of levels to be used for generating the replicas of the rear IBI 105 is expanded simultaneously with the range of levels to be used for generating the replicas of the front IBI 104, accuracy of signal detection in the previous repetition stage is lower than that in the current repetition stage. Thus, an effect of repetitive processing is limited. Therefore, in the first embodiment, the range of levels to be used for generating the replicas of the front IBI 104 is first expanded, and the range of levels to be used for generating the replicas of the rear IBI 105 is maintained as before. Then, the range of levels to be used for generating the replicas of the rear IBI 105 is expanded in the subsequent repetitive processing. This configuration enables an effect of repetitive processing to be enhanced, and also enables interference components included in the received signal to be further reduced.

It should be noted that the operation illustrated in FIG. 7 is an example, and the order of processing can be changed within the scope of the technical idea of the present invention. For example, in the above embodiment, equalization processing is performed for each frame, and a replica is updated for each block. However, the present invention is not limited to such an example, and each loop process illustrated in FIG. 7 can be changed also in the order of execution and conditions for performing the loop process. For example, in the above embodiment, interference cancellation is finally performed by use of all replicas of signal components of a plurality of levels obtained by decomposition of an interference component. However, the replicas of all the levels are not necessarily required to be generated. Therefore, "$M_{max}-1$" in step S115 may be a value smaller than "$M_{max}-1$".

Figure 12:
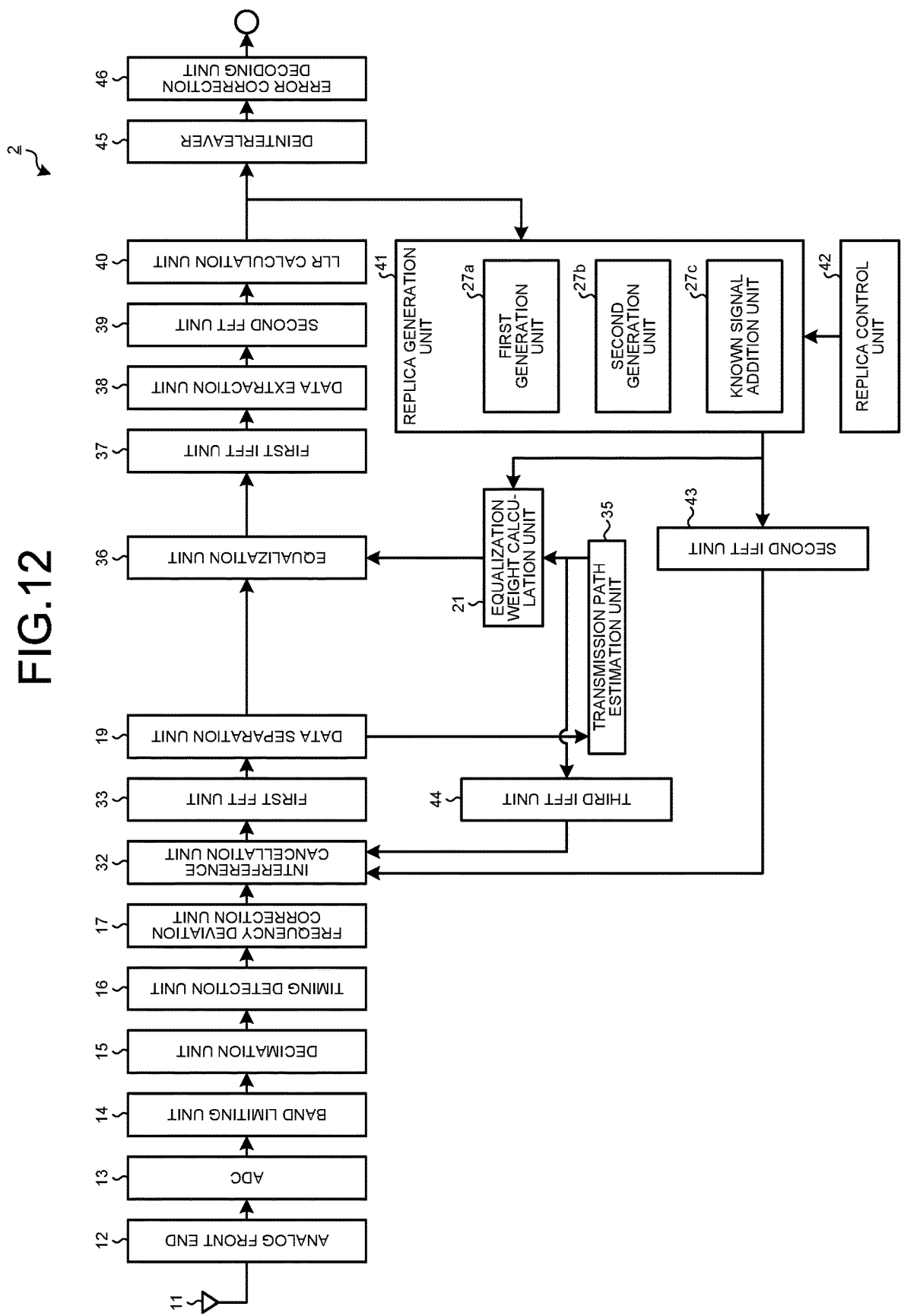
FIG. 12 is a diagram illustrating a wireless communication apparatus according to a variation of the first embodiment of the present invention.

FIG. 12 is a diagram illustrating a wireless communication apparatus 2 according to a variation of the first embodiment of the present invention. The wireless communication apparatus 2 illustrated in FIG. 12 performs OFDM transmission using no CP.

The wireless communication apparatus 2 includes the antenna 11, the analog front end 12, the ADC 13, the band limiting unit 14, the decimation unit 15, the timing detection unit 16, and the frequency deviation correction unit 17. The wireless communication apparatus 2 further includes an interference cancellation unit 32, a first FFT unit 33, the data separation unit 19, a transmission path estimation unit 35, the equalization weight calculation unit 21, an equalization unit 36, a first IFFT unit 37, a data extraction unit 38, a second FFT unit 39, and an LLR calculation unit 40. The wireless communication apparatus 2 further includes a replica generation unit 41, a replica control unit 42, a second IFFT unit 43, a third IFFT unit 44, a deinterleaver 45, and an error correction decoding unit 46. The replica generation unit 41 includes the first generation unit 27a, the second generation unit 27b, and the known signal addition unit 27c. In FIG. 12, constituent elements similar to the constituent elements illustrated in FIG. 1 are denoted by the same reference signs, and further description will be omitted. Hereinafter, differences from the wireless communication apparatus 1 illustrated in FIG. 1 will be mainly described.

The first FFT unit 33 converts a signal in a range wider than the detection target block into a signal in the frequency domain so as to perform a process of overlap frequency domain equalization. The transmission path estimation unit 35 performs transmission path estimation, and inputs a transmission path estimation value to the equalization weight calculation unit 21 and the third IFFT unit 44. The equalization unit 36 performs equalization processing based on calculated equalization weights. The first IFFT unit 37 performs IFFT processing on a received signal on which equalization processing has been performed, to convert the received signal into a received signal in the time domain.

The data extraction unit 38 extracts detection target data from the received signal in the time domain. The second FFT unit 39 performs FFT processing with the number of points corresponding to one OFDM symbol to convert the received signal into a signal in the frequency domain again, and inputs the signal to the LLR calculation unit 40. The LLR calculation unit 40 calculates an LLR for each subcarrier from the input signal.

Under the control of the replica control unit 42, the replica generation unit 41 generates a replica of a specified level for each interference component. The replica generation unit 41 inputs the generated replicas to the equalization weight calculation unit 21 and the second IFFT unit 43. The second IFFT unit 43 performs IFFT processing on the input replicas to convert the replicas into signals in the time domain, and inputs the signals obtained by conversion to the interference cancellation unit 32. The third IFFT unit 44 performs IFFT processing on the transmission path estimation value input from the transmission path estimation unit 35 to convert the value into a signal in the time domain, and inputs the signal after conversion to the interference cancellation unit 32. The interference cancellation unit 32 cancels the interference components of the received signal by using the received signals in the time domain and the replicas. At this time, the interference cancellation unit 32 convolves the replicas of the OFDM time waveform, and subtracts the convolved replicas from the received signal, by using an impulse response obtained from the transmission path estimation value obtained in the frequency domain. As a result, the interference cancellation unit 32 can cancel the interference components of the received signal.

As described above, according to the wireless communication apparatus 2 illustrated in FIG. 12, it is possible to achieve an effect similar to that of the wireless communication apparatus 1 illustrated in FIG. 1 also in the OFDM transmission using no CP.

Figure 13:
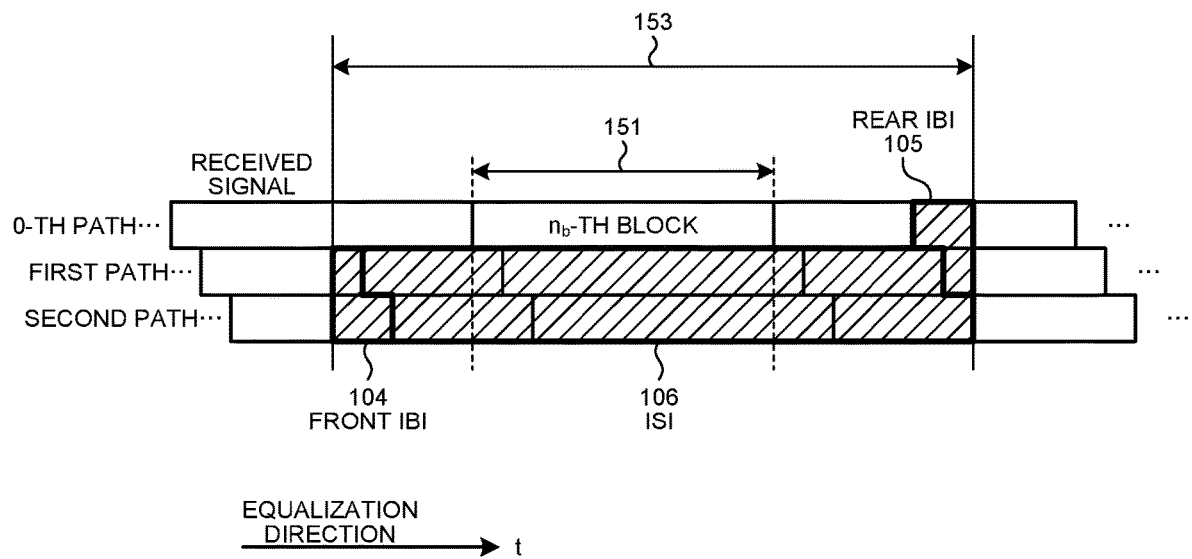
FIG. 13 is a diagram illustrating a first variation of the definitions of the interference components to be canceled from the received signal, by the wireless communication apparatus illustrated in FIG. 1.
Figure 14:
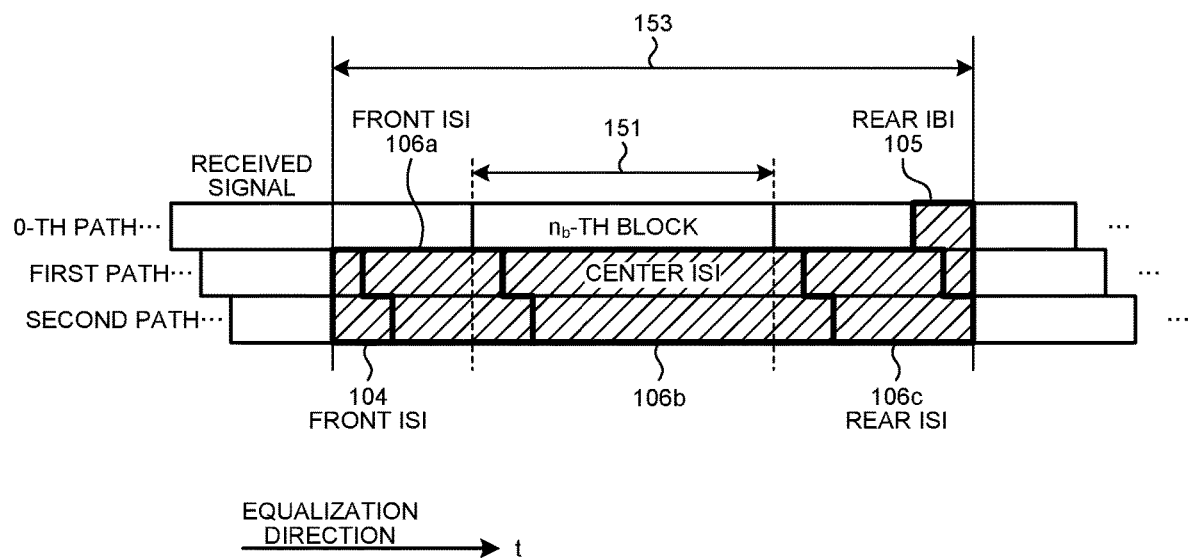
FIG. 14 is a diagram illustrating a second variation of the definitions of the interference components to be canceled from the received signal, by the wireless communication apparatus illustrated in FIG. 1.

FIG. 13 is a diagram illustrating a first variation of the definitions of the interference components to be canceled from the received signal, by the wireless communication apparatus 1 illustrated in FIG. 1. FIG. 14 is a diagram illustrating a second variation of the definitions of the interference components to be canceled from the received signal, by the wireless communication apparatus 1 illustrated in FIG. 1. The front IBI 104 and the rear IBI 105 are defined in FIG. 4 on the assumption that a signal component of the detection target range is regarded as a signal component to be extracted. However, the present invention is not limited to such an example. Other examples are also possible as long as interference cancellation is performed in conjunction with overlap frequency domain equalization based on a predetermined criterion such as the least-squares-error criterion, on the assumption that an arbitrarily defined signal component is regarded as a signal component to be extracted. In the example of FIG. 13, the front IBI 104, the rear IBI 105, and the ISI 106 are defined on the assumption that data other than the last two symbols in a processing area are regarded as a signal component to be extracted. Furthermore, in the example of FIG. 14, the front IBI 104 and a front ISI 106a are defined as front interference components, and a center ISI 106b, a rear ISI 106c, and the rear IBI 105 are defined as rear interference components.

It should be noted that it is also possible to apply the technique of the present embodiment described above to the case where a delay amount in a delay wave exceeds a CP length in block transmission, by performing similar processing and extracting a data portion. In addition, the technique of the present embodiment can be applied not only to single carrier block transmission but also to single carrier transmission in which data are not blocked in transmission. Furthermore, the technique of the present embodiment can also be applied to a multi-antenna communication apparatus using a plurality of transmitting and receiving antennas, in consideration of inter-antenna interference.

Second Embodiment

Described below in a second embodiment is a wireless communication apparatus that performs a process of receiving a signal transmitted by use of two or more antennas, such as in the cases of multiuser transmission, spatial multiplexing transmission, and transmission diversity. Each of the cases of multiuser transmission and spatial multiplexing transmission is described below. Although description of the case of transmission diversity is omitted, a configuration for transmission diversity can be implemented by a similar function.

Figure 15:
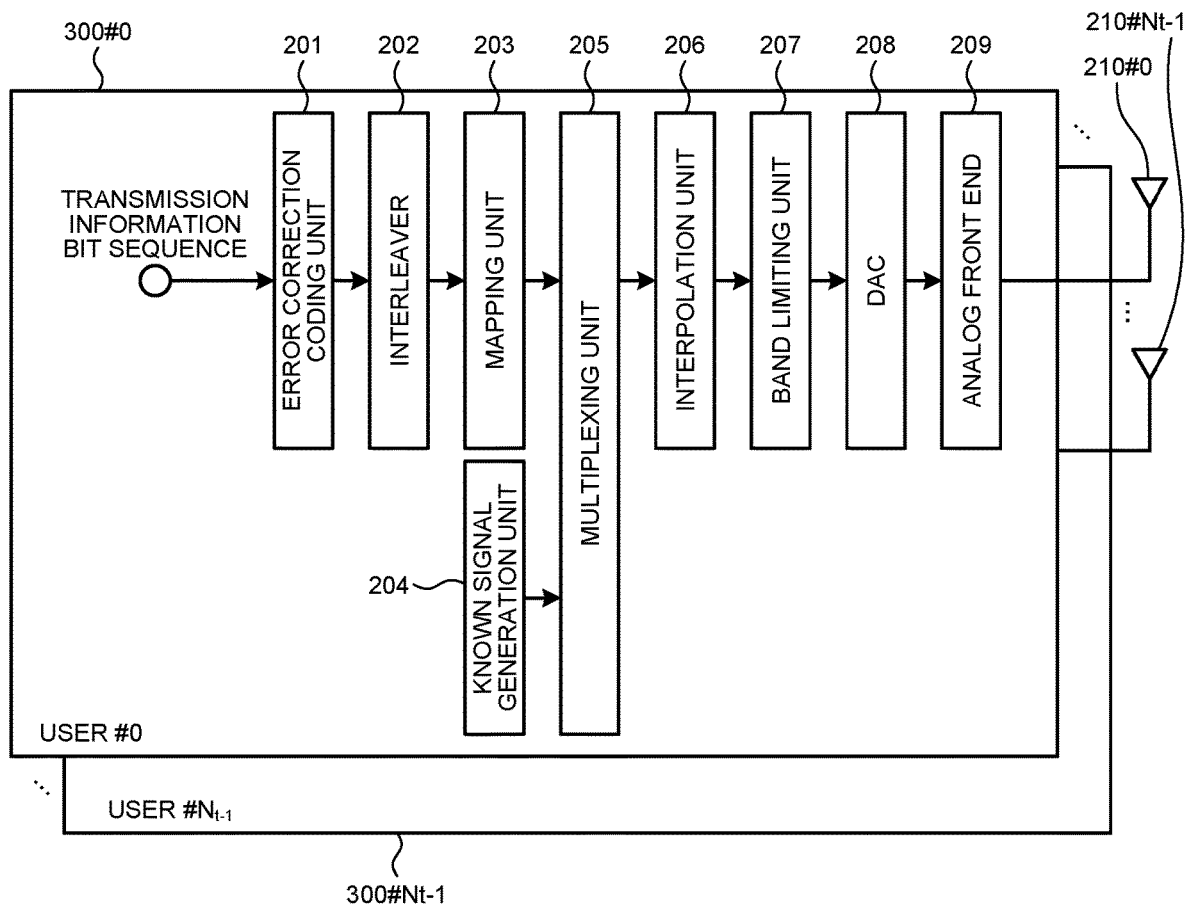
FIG. 15 is a diagram illustrating a configuration for multiple users to transmit signals in a wireless communication system according to a second embodiment of the present invention.

FIG. 15 is a diagram illustrating a configuration for multiple users to transmit signals in a wireless communication system according to the second embodiment of the present invention.

FIG. 15 illustrates wireless transmission apparatuses 300#0 to 300# $N_t$-1 of $N_t$ users #0 to # $N_t$-1. When it is not necessary to distinguish between the wireless transmission apparatuses 300#0 to 300# $N_t$-1, the apparatuses are each simply referred to as the wireless transmission apparatus 300. Each of the plurality of wireless transmission apparatuses 300 includes an error correction coding unit 201, an interleaver 202, a mapping unit 203, a known signal generation unit 204, a multiplexing unit 205, an interpolation unit 206, a band limiting unit 207, a digital-to-analog converter (DAC) 208, an analog front end 209, and a transmission antenna 210. In the example of FIG. 15, each wireless transmission apparatus 300 includes the single transmission antenna 210. However, the number of the transmission antennas is not limited.

The error correction coding unit 201 performs error correction coding on a bit sequence of input transmission information, and inputs the coded bit sequence, on which error correction coding has been performed, to the interleaver 202. The interleaver 202 performs interleaving processing on a block basis to change the order of the coded bit sequence. The interleaver 202 inputs the coded bit sequence which has been obtained to the mapping unit 203. The mapping unit 203 performs mapping based on a multiple-value number by using the input coded bit sequence, and generates a symbol sequence by using a modulation scheme such as phase shift keying (PSK) or quadrature amplitude modulation (QAM). The known signal generation unit 204 generates a known signal sequence. The multiplexing unit 205 multiplexes the symbol sequence and the known signal sequence to generate a transmission signal, and inputs the generated transmission signal to the interpolation unit 206.

The interpolation unit 206 performs an interpolation process for increasing the sampling frequency of the input transmission signal, and inputs the processed transmission signal to the band limiting unit 207. The band limiting unit 207 performs a band limiting process on the input transmission signal, and inputs the processed transmission signal to the DAC 208. The DAC 208 converts the input transmission signal from a digital signal to an analog signal, and inputs the converted transmission signal to the analog front end 209. The analog front end 209 upconverts and amplifies the transmission signal, and transmits the transmission signal from the transmission antenna 210.

Figure 16:
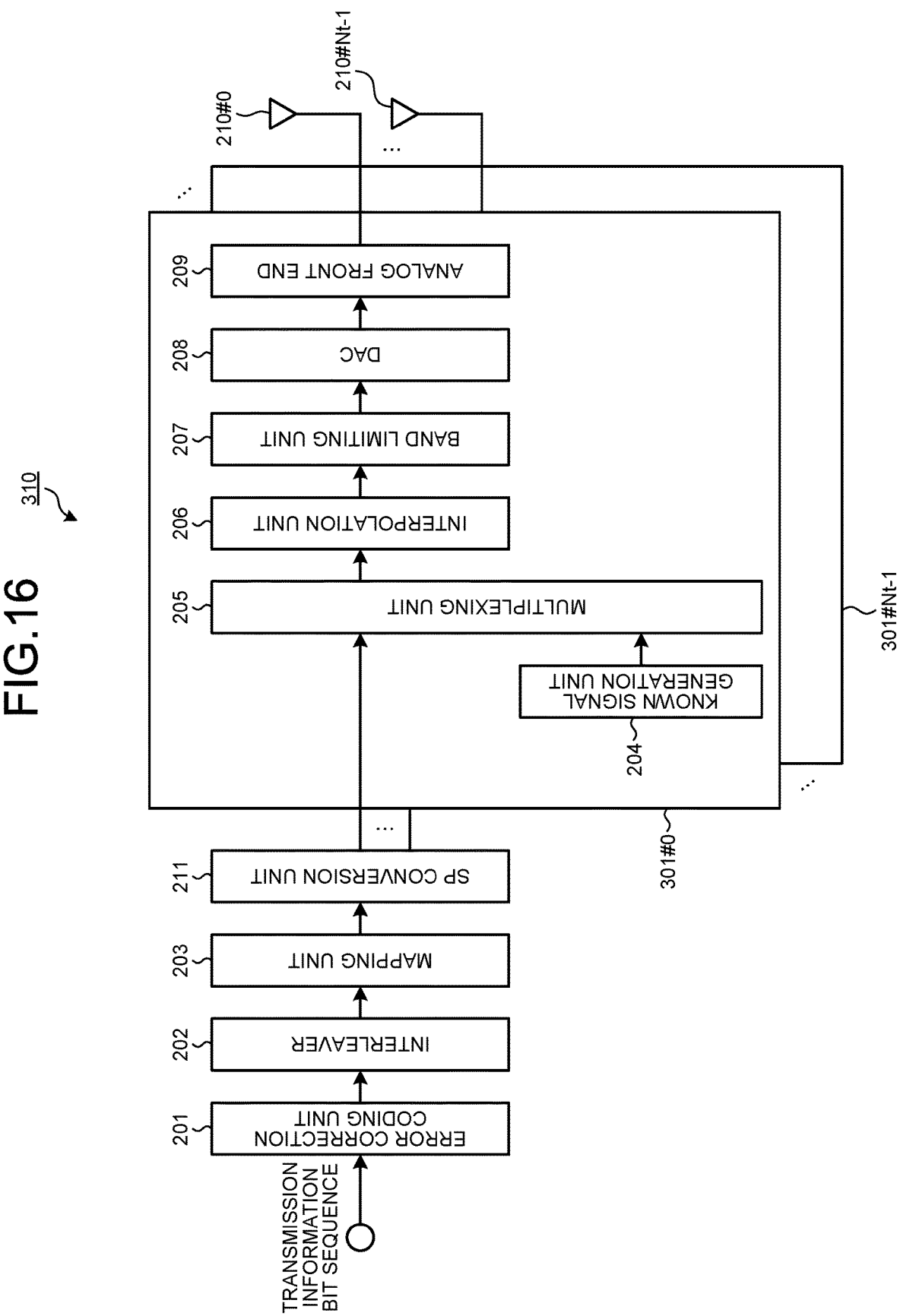
FIG. 16 is a diagram illustrating a configuration for transmitting signals by spatial multiplexing in the wireless communication system according to the second embodiment of the present invention.

FIG. 16 is a diagram illustrating a configuration for transmitting signals by spatial multiplexing in the wireless communication system according to the second embodiment of the present invention. Hereinafter, constituent elements similar to those of the wireless transmission apparatus 300 illustrated in FIG. 15 are denoted by the same reference signs, and further description will be omitted. Thus, differences from the wireless transmission apparatus 300 will be mainly described.

A wireless transmission apparatus 310 illustrated in FIG. 16 includes the error correction coding unit 201, the interleaver 202, the mapping unit 203, a serial parallel (SP) conversion unit 211, and a plurality of transmission processing units 301#0 to 301# $N_t$-1. The wireless transmission apparatus 310 includes $N_t$ transmission antennas 210#0 to 210# $N_t$-1. In the wireless transmission apparatus 310, the transmission processing units 301#0 to 301# $N_t$-1 are provided so as to correspond to the transmission antennas 210#0 to 210# $N_t$-1, respectively. Hereinafter, when it is not necessary to distinguish between the transmission processing units 301#0 to 301# $N_t$-1, the units are each simply referred to as the transmission processing unit 301. In addition, when it is not necessary to distinguish between the transmission antennas 210#0 to 210# $N_t$-1, the antennas are each simply referred to as the transmission antenna 210.

Each of the plurality of transmission processing units 301 includes the known signal generation unit 204, the multiplexing unit 205, the interpolation unit 206, the band limiting unit 207, the DAC 208, the analog front end 209, and the transmission antenna 210.

The SP conversion unit 211 performs serial parallel conversion for converting an input serial signal into parallel signals the number of which is equal to the number $N_t$ of the transmission antennas. The SP conversion unit 211 inputs one of the generated parallel signals to each of the transmission processing units 301. With this configuration, a plurality of transmission signals is transmitted from the plurality of transmission antennas 210#0 to 210# $N_t$-1. The transmission signals are transmitted to receiving-side wireless communication apparatuses via a multipath propagation channel.

Figure 17:
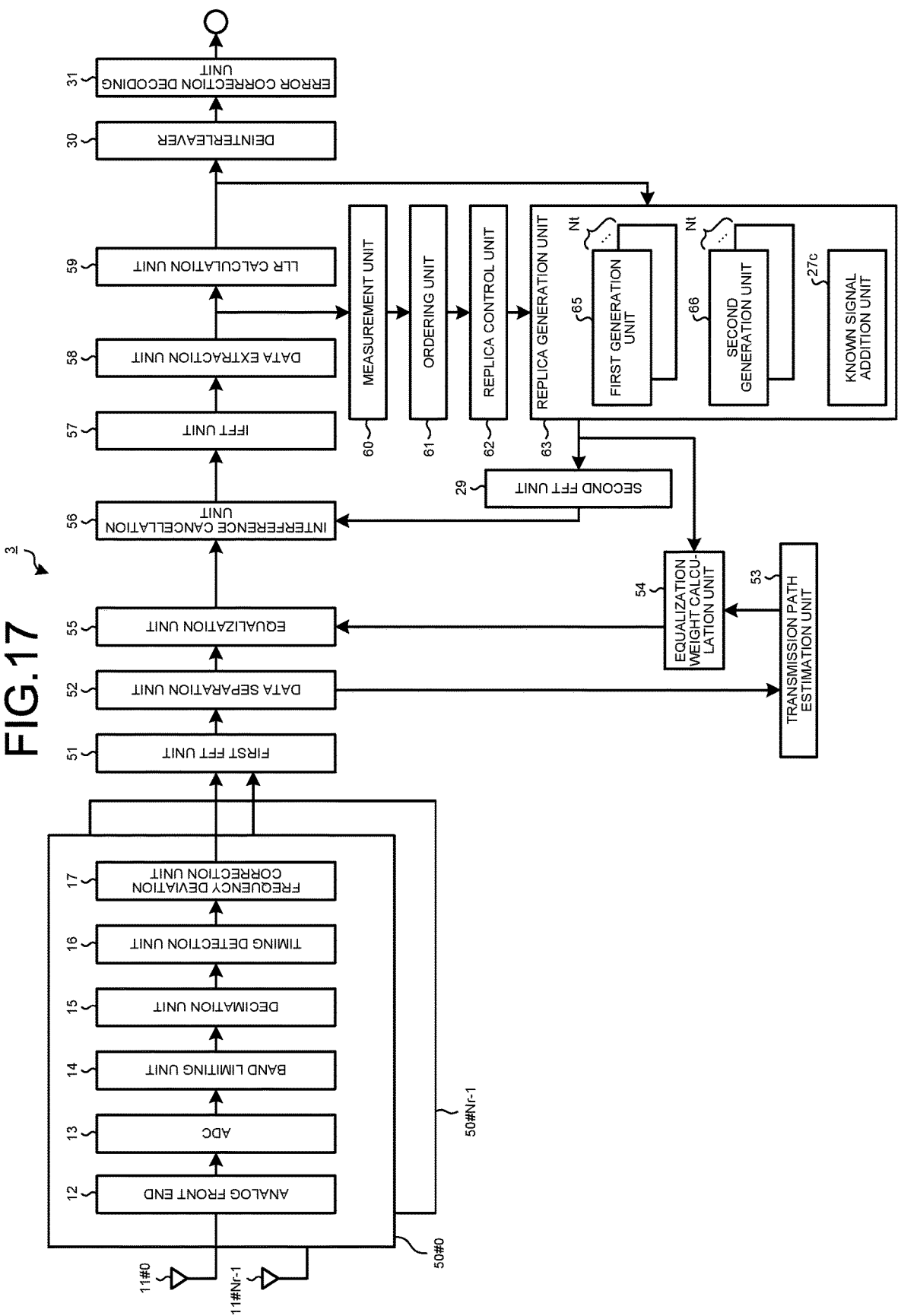
FIG. 17 is a diagram illustrating the configuration of a wireless communication apparatus according to the second embodiment of the present invention.

FIG. 17 is a diagram illustrating the configuration of a wireless communication apparatus 3 according to the second embodiment of the present invention. The wireless communication apparatus 3 includes $N_r$ receiving antennas 11#0 to 11# $N_r$-1 and a plurality of reception processing units 50#0 to 50# $N_r$-1. Each reception processing unit 50 includes the analog front end 12, the ADC 13, the band limiting unit 14, the decimation unit 15, the timing detection unit 16, and the frequency deviation correction unit 17. The wireless communication apparatus 3 further includes a first FFT unit 51, a data separation unit 52, a transmission path estimation unit 53, an equalization weight calculation unit 54, an equalization unit 55, an interference cancellation unit 56, an IFFT unit 57, a data extraction unit 58, and an LLR calculation unit 59. The wireless communication apparatus 3 further includes the deinterleaver 30, the error correction decoding unit 31, a measurement unit 60, an ordering unit 61, a replica control unit 62, a replica generation unit 63, and the second FFT unit 29.

The first FFT unit 51 performs FFT processing on received signals input from the plurality of reception processing units 50 to convert the received signals into signals in the frequency domain, and inputs the received signals subjected to conversion to the data separation unit 52. The data separation unit 52 separates the received signals into data and known signals. Then, the data separation unit 52 inputs the received signals including the data to the equalization unit 55, and inputs the known signals to the transmission path estimation unit 53. The transmission path estimation unit 53 calculates transmission path estimation values, and inputs the calculated transmission path estimation values to the equalization weight calculation unit 54. The equalization weight calculation unit 54 calculates equalization weights based on the input transmission path estimation values, and inputs the calculated equalization weights to the equalization unit 55. The equalization unit 55 performs equalization processing on the received signals by using the input equalization weights, and inputs the received signals on which equalization processing has been performed to the interference cancellation unit 56. The interference cancellation unit 56 uses replicas input from the second FFT unit 29 to cancel interference components included in the received signals. The interference cancellation unit 56 does not perform the process of canceling the interference components until an ordering process to be described below is completed. The interference cancellation unit 56 inputs the received signals which have been processed to the IFFT unit 57. In the case where the process has not been performed, the interference cancellation unit 56 inputs the input received signals with no change to the IFFT unit 57. The IFFT unit 57 performs IFFT processing for converting the input received signals into signals in the time domain, and inputs the received signals which have been processed to the data extraction unit 58.

The data extraction unit 58 extracts detection target data from the input received signals, and inputs the detection target data to the LLR calculation unit 59. The data extraction unit 58 also extracts known signals from the received signals, and inputs the known signals to the measurement unit 60. The LLR calculation unit 59 calculates LLRs by using the input received signals, and outputs the LLRs to the deinterleaver 30 and the replica generation unit 63. The measurement unit 60 measures error powers indicating the magnitudes of interference components. The measurement unit 60 measures the magnitudes of interference components included in the received signals on which equalization processing has been performed or equalization processing and cancellation of interference components have been performed. The measurement unit 60 can calculate the error powers by using, for example, the known signals. The measurement unit 60 inputs the calculated error powers to the ordering unit 61. The ordering unit 61 determines the order of processing the received signals based on the input error powers which are values indicating the magnitudes of the interference components. The replica control unit 62 controls the order in which the replica generation unit 63 processes the received signals, based on the order determined by the ordering unit 61. The replica control unit 62 instructs the replica generation unit 63 to generate a replica, by using at least one of a range for reproducing the interference component, a block number of a processing target in the received signal, an identifier of the transmission antenna of a transmission source of the received signal, and an identifier of a transmission source user of the received signal. The replica control unit 62 causes the replica generation unit 63 to generate a replica by specifying the range for reproducing the interference component and a target transmission antenna number.

In accordance with the instruction from the replica control unit 62, the replica generation unit 63 generates a replica by using a signal transmitted from a transmission antenna indicated by the specified transmission antenna number. The replica generation unit 63 includes $N_t$ first generation units 65 and $N_t$ second generation units 66, corresponding to the $N_t$ transmission antennas, and the known signal addition unit 27c. Each of the first generation units 65 has a function similar to that of the first generation unit 27a. Each of the second generation units 66 has a function similar to that of the second generation unit 27b. The replica generation unit 63 inputs the generated replica to the second FFT unit 29 and the equalization weight calculation unit 54.

Figure 18:
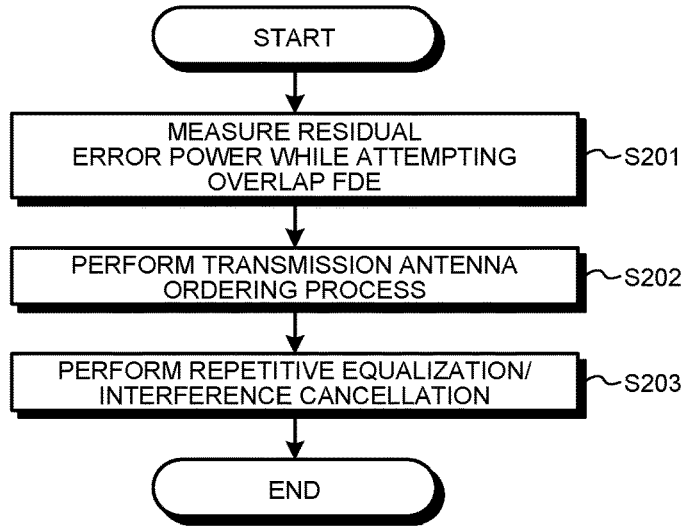
FIG. 18 is a flowchart illustrating the overall operation of the wireless communication apparatus illustrated in FIG. 17.

FIG. 18 is a flowchart illustrating the overall operation of the wireless communication apparatus 3 illustrated in FIG. 17. The wireless communication apparatus 3 measures a residual error power while attempting overlap FDE (step S201). Subsequently, the wireless communication apparatus 3 performs a transmission antenna ordering process (step S202). For example, in the case where an index value decreases as accuracy of signal detection increases, the wireless communication apparatus 3 can determine the order of process execution such that a received signal with a smaller index value is processed earlier. After determining the processing order of the received signals, the wireless communication apparatus 3 performs repetitive equalization processing and interference cancellation processing (step S203).

Figure 19:
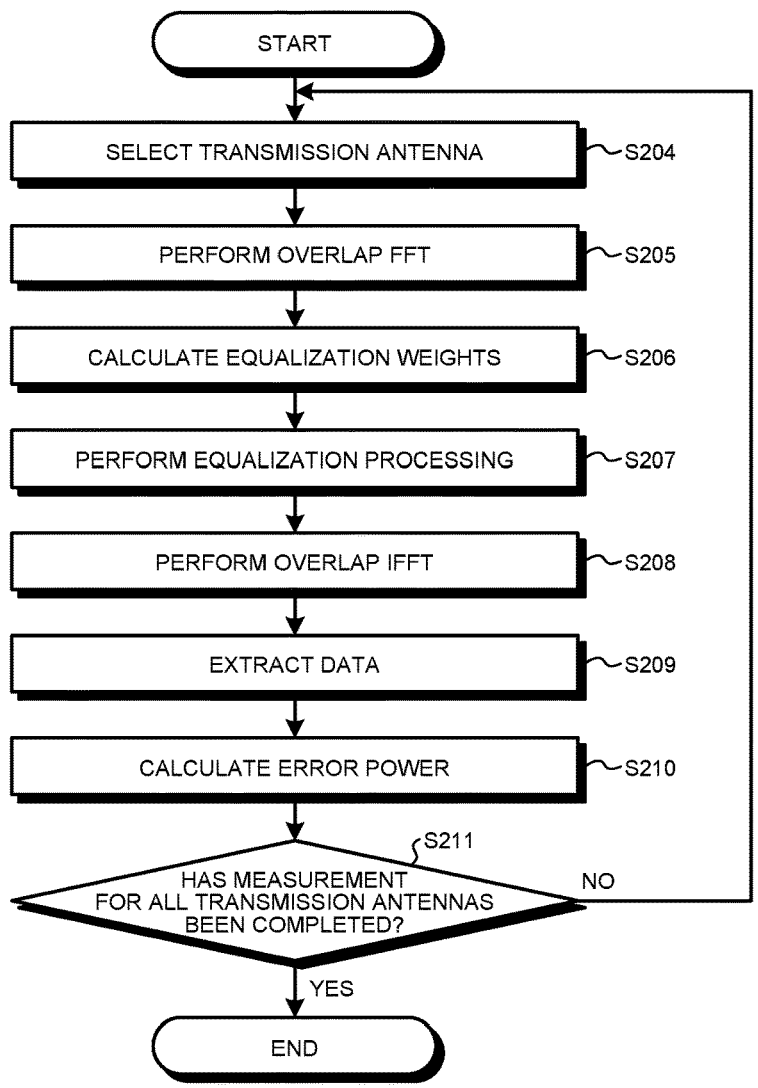
FIG. 19 is a flowchart illustrating a detailed operation of step S201 in FIG. 18.

FIG. 19 is a flowchart illustrating a detailed operation of step S201 in FIG. 18. The measurement unit 60 selects one of the transmission antennas 210 as a processing target (step S204). Then, the first FFT unit 51 performs overlap FFT processing to obtain a signal in the frequency domain (step S205). The equalization weight calculation unit 54 generates equalization weights based on a transmission path estimation value (step S206). The equalization unit 55 performs equalization processing (step S207). The signal on which the equalization processing has been performed is subjected to overlap IFFT processing performed by the IFFT unit 57 (step S208). The data extraction unit 58 extracts a known signal, and inputs the known signal to the measurement unit 60 (step S209). The measurement unit 60 calculates a difference between the input equalized known signal and a known signal known in advance, and accumulates the difference to calculate an error power (step S210). The measurement unit 60 determines whether measurement for all the transmission antennas has been completed (step S211). If measurement for all the transmission antennas has been completed (step S211: Yes), the measurement unit 60 terminates measurement of the residual error power. If measurement for all the transmission antennas has not been completed (step S211: No), the process returns to step S204.

Figure 20:
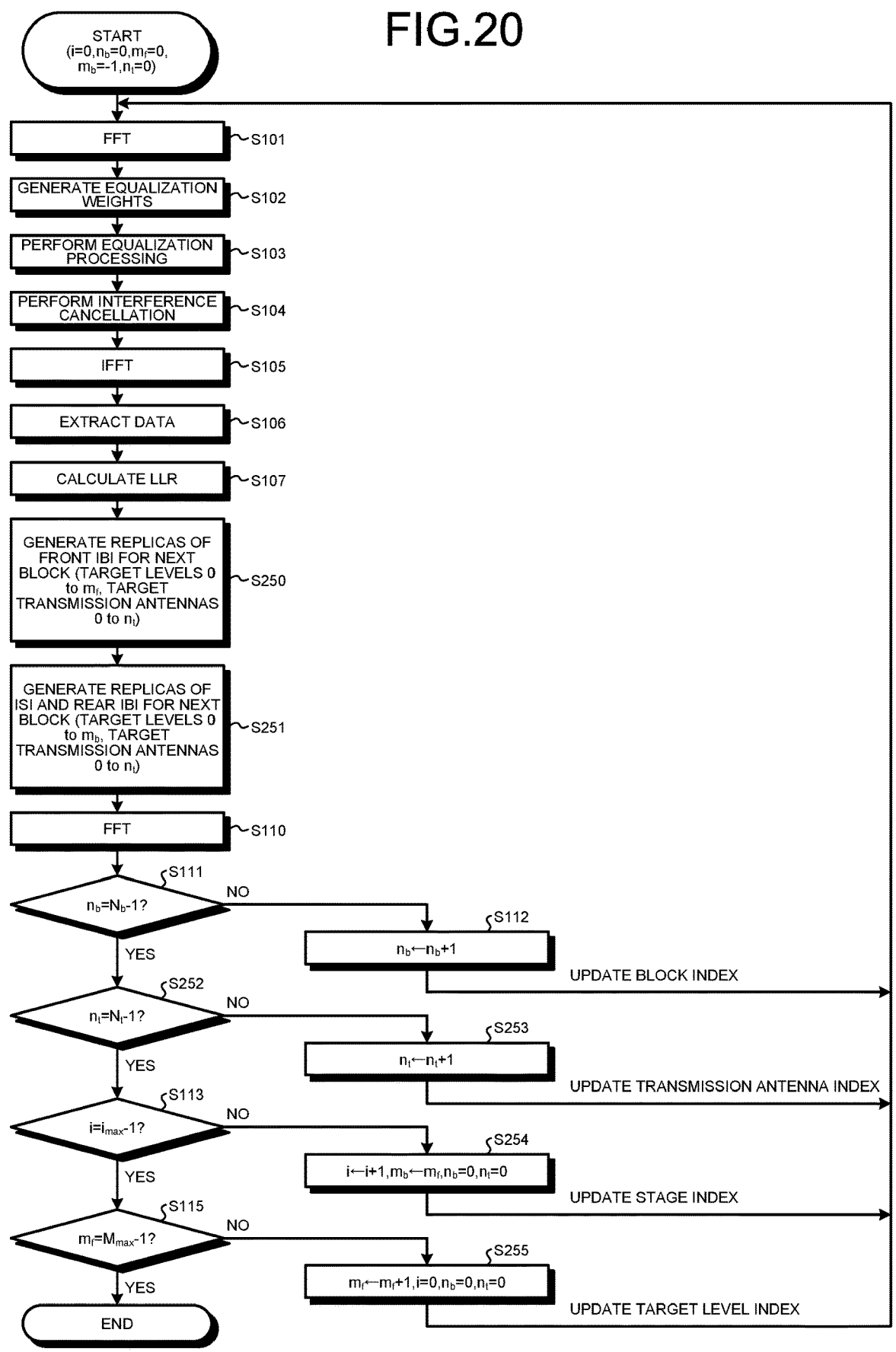
FIG. 20 is a flowchart illustrating a detailed operation of step S203 in FIG. 18.

FIG. 20 is a flowchart illustrating a detailed operation of step S203 in FIG. 18. It should be noted that steps similar to those in the operation illustrated in FIG. 7 are denoted by the same reference signs in FIG. 20, and further description will be omitted. Hereinafter, differences from the operation illustrated in FIG. 7 will be mainly described.

A transmission antenna index $n_t$ is an index of the transmission antenna 210 as a processing target, and takes a value from 0 to $N_t-1$. When generating a replica of the front IBI 104 for the next block, the first generation unit 65 sets, as a processing target, a received signal received by a target transmission antenna in addition to a specified level (step S250). When generating replicas of the ISI 106 and the rear IBI 105 for the next block, the second generation unit 66 sets, as processing targets, received signals received by target transmission antennas 0 to $n_t$ in addition to a target level (step S251).

If the detection target block index $n_b$ has reached the number $N_b$ of blocks in one frame (step S111: Yes), that is, if the processing for one frame has been completed, the equalization unit 55 determines whether the transmission antenna index $n_t$ has reached the number $N_t-1$ of antennas (step S252). If the transmission antenna index $n_t$ has reached the number $N_t-1$ of antennas (step S252: Yes), the equalization unit 55 proceeds to the process of step S113. If the transmission antenna index $n_t$ has not reached the number $N_t-1$ of antennas (step S252: No), the equalization unit 55 increments $n_t$ (step S253).

In addition, if the repetition stage index i has not reached the maximum number $i_{mak}-1$ of repetition stages (step S113: No), the value of $n_t$ is set such that $n_t=0$, in addition to performing the process of step S114 (step S254).

If the first target level index $m_f$ has not reached $M_{max}-1$ (step S115: No), the equalization unit 55 sets the value of $n_t$ such that $n_t=0$, in addition to performing the process of step S116 (step S255).

As described above, according to the second embodiment of the present invention, it is possible to cancel interference components not only for IBI and ISI in a signal transmitted from a target transmission antenna, but also for interference (including IBI) from a signal transmitted from another transmission antenna. In addition, the magnitude of an interference component included in a received signal is measured for each transmission antenna. Thus, the processing order of the received signals is determined based on the measurement results. As a result, a signal which is higher in detection accuracy is processed earlier, and a detection result thereof is used in performing the next detection process. Thus, it is also possible to improve accuracy of the next detection process.

It should be noted that the function of the measurement unit 60 described above can also be applied to the case of using one transmission antenna and one or more receiving antennas, and it is also possible to add the function of the measurement unit 60 to the configuration of the first embodiment described above. For example, after preparing two sets in which a demodulation parameter set differs between the first range and the second range and performing equalization processing based on the above-described sets, the measurement unit 60 calculates a value as an indicator of reliability, such as an error power, for each of the two sets. Then, it is also possible to select, as a final detection result, a processing result based on one of the two sets selected on the basis of the value of the indicator.

It should be noted that the interference cancellation process is performed in the frequency domain in the second embodiment described above. Meanwhile, the interference cancellation process may be performed in the time domain in the case where equivalent processing can be performed also in the time domain. Furthermore, the technique described in the second embodiment of the present invention can also be applied to OFDM transmission.

It should be noted that the hardware configuration of the wireless communication apparatus 3 according to the second embodiment described above is similar to that of the wireless communication apparatus 1 according to the first embodiment, and therefore description thereof is omitted here. The same applies to the wireless transmission apparatus 300 and the wireless transmission apparatus 310.

The configuration illustrated in each of the above embodiments illustrates an example of the subject matter of the present invention, and it is possible to combine the configuration with another technique that is publicly known, and is also possible to make omissions and changes to part of the configuration without departing from the gist of the present invention.

For example, in the second embodiment described above, an error power calculated by use of a known signal is used as a value indicating the magnitude of an interference component remaining in a received signal. However, the present invention is not limited to such an example. For example, a value indicating the magnitude of an interference component remaining in a received signal may be calculated by use of, for example, an impulse response obtained by transmission path estimation and a norm value of equalization weights.

Furthermore, although the wireless communication system has been described in the above embodiment, the present invention is not limited to such an example. The technique of the present invention can be applied not only to wireless transmission but also to wired transmission. When the technique of the above embodiment is applied to wired transmission, a communication apparatus includes a transmission port instead of the above-described transmission antenna, and a reception port instead of the receiving antenna.

REFERENCE SIGNS LIST 1, 2, 3 wireless communication apparatus; 11 antenna; 12 analog front end; 13 ADC; 14 band limiting unit; 15 decimation unit; 16 timing detection unit; 17 frequency deviation correction unit; 18, 33, 51 first FFT unit; 19, 52 data separation unit; 20, 35, 53 transmission path estimation unit; 21, 54 equalization weight calculation unit; 22, 36, 55 equalization unit; 23, 32, 56 interference cancellation unit; 24, 57 IFFT unit; 25, 38, 58 data extraction unit; 26, 40, 59 LLR calculation unit; 27, 41, 63 replica generation unit; 27a, 65 first generation unit; 27b, 66 second generation unit; 27c known signal addition unit; 28, 42, 62 replica control unit; 29, 39 second FFT unit; 30, 45 deinterleaver; 31, 46 error correction decoding unit; 37 first IFFT unit; 43 second IFFT unit; 44 third IFFT unit; 50 reception processing unit; 60 measurement unit; 61 ordering unit; 71 processing circuit; 72 memory; 73 processor; 101 0-th level QPSK sub-symbol; 102 first level QPSK sub-symbol; 103 16QAM symbol; 104 front IBI; 105 rear IBI; 106 ISI; 107 0-th level replica; 108 first level replica; 150 received signal; 151 first range; 152 second range; 153 processing range; 154 LLR; 155 LLR series; 201 error correction coding unit; 202 interleaver; 203 mapping unit; 204 known signal generation unit; 205 multiplexing unit; 206 interpolation unit; 207 band limiting unit; 208 DAC; 209 analog front end; 210 transmission antenna; 211 SP conversion unit; 300, 310 wireless transmission apparatus.

The invention claimed is:
1. A communication apparatus comprising:
processing circuitry
to perform equalization processing on a part of a received signal corresponding to a processing range including a first range and a second range, the first range including detection target data, the second range being outside the first range;
to define a plurality of replica generation ranges in the processing range, decompose the part of the received signal corresponding to each of the plurality of defined replica generation ranges into a plurality of signal components, and reproduce a part of the received signal corresponding to each of the replica generation ranges for each of the signal components to generate a replica of an interference component for a part of the received signal corresponding to the first range, for each of the replica generation ranges;

to cancel the interference component from the part of the received signal corresponding to the processing range by using a plurality of the replicas; and to extract the detection target data from the received signal.

2. The communication apparatus according to claim 1, wherein the processing circuitry includes a plurality of generation circuits corresponding to two or more of the replica generation ranges, each of the plurality of generation circuits generates the replica by using a result of equalization of a part of the received signal that corresponds to corresponding one of the replica generation ranges, and a number of the signal components to be used by each of the plurality of generation circuits to generate the replica is determined for each of the generation circuits based on reliability of the result of equalization of the part of the received signal corresponding to the replica generation range.

3. The communication apparatus according to claim 2, wherein the processing circuitry repeats the equalization processing, cancellation of the interference component, and extraction of the detection target data, each of the plurality of generation circuits independently increases the number of the signal components to be used to generate the replica, according to a number of repetitions, and the processing circuitry regards the extracted detection target data as a detection result in a case where the number of the signal components to be used by each of the plurality of generation circuits generate the replica has been increased to a predetermined number corresponding to each of the plurality of generation circuits.

4. The communication apparatus according to claim 3, wherein the predetermined number in at least one of the generation circuits is a number of the signal components obtained by decomposition of the received signal.

5. The communication apparatus according to claim 1, wherein the processing circuitry further measures a magnitude of the interference component included in the part of the received signal corresponding to the first range on which the equalization processing has been performed or the equalization processing and cancellation of the interference component have been performed.

6. The communication apparatus according to claim 5, wherein the received signals are signals transmitted by use of a plurality of antennas, the the processing circuitry measures the magnitude of the interference component for each of the antennas, and the processing circuitry further determines an order of processing the received signals based on the measured magnitudes of the interference components.

7. The communication apparatus according to claim 1, the processing circuitry generates the replica, by using two or more of: a number of the signal components to be used to generate the replica, a block number of a processing target in the received signal, an identifier of a transmission antenna that is a transmission source of the received signal, and an identifier of a user as the transmission source of the received signal.

8. The communication apparatus according to claim 1, further comprising:

one or more transmission antennas or transmission ports; and one or more receiving antennas or reception ports, wherein a signal is transmitted by use of a single carrier system.

9. The communication apparatus according to claim 1, further comprising:

one or more transmission antennas or transmission ports; and one or more receiving antennas or reception ports, wherein a signal is transmitted by use of a single carrier block transmission system, and the received signal is processed, the received signal having a cyclic prefix smaller than a delay wave in a transmission path or having no cyclic prefix.

10. The communication apparatus according to claim 1, further comprising:

one or more transmission antennas or transmission ports; and one or more receiving antennas or reception ports, wherein a signal is transmitted by use of an orthogonal frequency division multiplex system or a multicarrier block transmission system, and the received signal is processed, the received signal having a cyclic prefix smaller than a delay wave in a transmission path or having no cyclic prefix.

11. The communication apparatus according to claim 1, wherein the processing circuitry includes a first generation circuit that corresponds to one of the replica generation ranges that is a first replica range, and a second generation circuit that corresponds to another one of the replica generation ranges that is a second replica range, the second replica range corresponding to a future range than the first replica range with respect to a direction on a time axis along which the equalization processing proceeds, a number of the signal components to be used by the first generation circuit is greater than or equal to a number of the signal components to be used by the second generation circuit.

12. A received signal processing method comprising:

on a part of a received signal corresponding to a processing range including a first range and a second range, the first range including detection target data, the second range being outside the first range;

defining a plurality of replica generation ranges in the processing range, decomposing the part of the received signal corresponding to each of the plurality of defined replica generation ranges into a plurality of signal components;

reproducing the part of the received signal corresponding to each of the replica generation ranges for each of the signal components to generate a replica of an interference component for the part of the received signal corresponding to the first range, for each of the replica generation ranges;

canceling the interference component from the part of the received signal corresponding to the processing range by using a plurality of the replicas; and extracting the detection target data from the received signal.

* * * * *